(12) United States Patent
Yamauchi

(10) Patent No.: US 10,596,991 B2
(45) Date of Patent: Mar. 24, 2020

(54) KNEE PROTECTION AIRBAG DEVICE

(71) Applicant: TOYODA GOSEI CO., LTD., Kiyosu-shi, Aichi-ken (JP)

(72) Inventor: Koji Yamauchi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 80 days.

(21) Appl. No.: 15/902,015

(22) Filed: Feb. 22, 2018

(65) Prior Publication Data
US 2018/0272982 A1    Sep. 27, 2018

(30) Foreign Application Priority Data

Mar. 27, 2017  (JP) ................................. 2017-061312
Sep. 27, 2017  (JP) ................................. 2017-185991

(51) Int. Cl.
*B60R 21/215*    (2011.01)
*B60R 21/206*    (2011.01)
*B60R 21/00*     (2006.01)

(52) U.S. Cl.
CPC .......... *B60R 21/215* (2013.01); *B60R 21/206* (2013.01); *B60R 2021/0051* (2013.01)

(58) Field of Classification Search
CPC ................ B60R 21/206; B60R 21/215; B60R 2021/0051
See application file for complete search history.

(56) References Cited

U.S. PATENT DOCUMENTS

| 7,055,851 | B2 * | 6/2006  | Takimoto | B60R 21/206 280/730.1 |
|-----------|------|---------|----------|------------------------|
| 7,226,075 | B2 * | 6/2007  | Nagata   | B60R 21/203 280/731   |
| 8,696,020 | B2 * | 4/2014  | Tanaka   | B60R 21/233 280/728.2 |
| 9,162,646 | B2 * | 10/2015 | Ando     | B60R 21/206           |
| 2004/0075253 | A1 * | 4/2004 | Morita | B60R 21/045 280/730.1 |
| 2005/0073134 | A1 * | 4/2005 | Matsuura | B60R 21/206 280/730.1 |
| 2005/0140123 | A1 * | 6/2005 | Hotta | B60R 21/206 280/730.1 |

(Continued)

FOREIGN PATENT DOCUMENTS

JP    2005-206068 A    8/2005
JP    2011-046259 A    3/2011

*Primary Examiner* — Barry Gooden, Jr.
(74) *Attorney, Agent, or Firm* — Posz Law Group, PLC

(57) ABSTRACT

A knee protection airbag device includes: a case including a circumferential wall part surrounding a protrusion opening and extending in a front side; and an airbag cover, made by rigidity resin, covering the protrusion opening and being connected to the case. The airbag cover includes: a connection wall part which extends forward from a front side of the decorative panel, and is arranged to cover an upper side of an upper wall part on an upper side in the circumferential wall part of the case. The connection wall part includes an engaging hole. The upper wall part includes a metal engaging hook protruding upward to be inserted into the engaging hole. The airbag cover includes a shield part configured to hide the engaging hook from a visual line. The shield part is integrally formed during molding of the airbag cover.

7 Claims, 17 Drawing Sheets

(56) References Cited

U.S. PATENT DOCUMENTS

| | | | | |
|---|---|---|---|---|
| 2006/0022440 A1* | 2/2006 | Umehara | .............. | B60R 21/206 |
| | | | | 280/730.1 |
| 2006/0279073 A1* | 12/2006 | Hotta | .................... | B60R 21/206 |
| | | | | 280/730.1 |
| 2007/0200322 A1* | 8/2007 | Sakakida | .............. | B60R 21/206 |
| | | | | 280/730.1 |
| 2009/0085333 A1* | 4/2009 | Imaeda | ............... | B60R 21/2032 |
| | | | | 280/730.1 |
| 2016/0052479 A1* | 2/2016 | Komatsu | .............. | B60R 21/231 |
| | | | | 280/730.1 |

* cited by examiner

KNEE PROTECTION AIRBAG DEVICE

CROSS-REFERENCE TO RELATED APPLICATION(S)

This application is based upon and claims the benefit of priority from Japanese Patent Application No. 2017-061312, filed on Mar. 27, 2017, and Japanese Patent Application No. 2017-185991, filed on Sep. 27, 2017, the entire contents of which are incorporated herein by reference.

BACKGROUND

1. Field of the Invention

The present invention relates to a knee protection airbag device which is mounted on a front side of a driver in a vehicle, and can protect a knee of a seated driver using an inflated airbag.

2. Description of the Related Art

In the related art, a knee protection airbag device for a driver includes a folded airbag, an inflator which supplies an inflation gas to the airbag, a case which houses and holds the airbag and the inflator and has a protrusion opening of the airbag, and an airbag cover which covers the protrusion opening of the case and has a door part which is opened by being pressed by the inflating airbag. The knee protection airbag device is mounted below a steering column on a front side of the seated driver (for example, see JP-A-2005-206068 and JP-A-2011-046259). In the case, the protrusion opening is arranged toward a rear side, and the case has a circumferential wall part which surrounds the protrusion opening and extends forward. The airbag cover is made of synthetic resin and covers the protrusion opening. The airbag cover has a door part which can be opened by being pressed by the airbag during inflation, and an outer edge part which surrounds the door part. The airbag cover includes a decorative panel which is arranged to be exposed to the indoor side, and a connection wall part which extends forward from the front side of the decorative panel and is arranged to cover the upper side of the upper wall part on the upper side in the circumferential wall part of the case. The connection wall part of the airbag cover includes an engaging hole which is penetrated vertically. The upper wall part of the case includes a metal engaging hook which protrudes upward to be inserted to the engaging hole. The airbag cover is connected to the case when the engaging hook inserted into the engaging hole is engaged with the connection wall part.

However, in the conventional knee protection airbag device, when a large gap is provided between the upper steering column and the column cover, a metal engaging hook is recognized visually by the driver. Further, although the engaging hook is arranged in a front deep position, if the luster of the metal engaging hook is recognized visually, the driver feels discomfort, and a design property in the vehicle cabin on the front side of the driver is deteriorated. Particularly, by a tilt mechanism which can adjust a vertical position of the steering wheel operated by the driver, the steering column may be excreted to be movable vertically, and may be adjusted such that the large gap is made between the airbag device and the column cover as the upper arranged member thereof. In this case, the engaging hook emitting luster can be easily recognized visually from the large gap.

Incidentally, as the above-described countermeasure, it is considered that a shielding material such as a black felt having flexibility is attached on the column cover side, and the engaging hook which emits the luster is hidden. However, the shielding material is prepared, and the shielding material is necessarily attached in the column cover and the like as the upper arranged member on the upper side of the airbag device, so that the countermeasure cannot be dealt with simply.

SUMMARY

The invention was made to solve the above-described problems, and an object thereof is to provide a knee protection airbag device which can easily suppress deterioration in a design property in a vehicle cabin on a front side of a driver while an engaging hook is not recognized visually.

According to an aspect of the invention, there is provided a knee protection airbag device mounted on a front side of a seated driver, the device including: a case which houses a driver-knee protection airbag and includes a circumferential wall part surrounding a protrusion opening and extending in a front side, the protrusion opening being arranged toward a rear side and allowing the airbag to protrude during inflation; and an airbag cover, made by rigidity resin, covering the protrusion opening of the case to allow the airbag to protrude during inflation, the airbag cover being connected to the case, and the airbag cover including: a decorative panel which covers the protrusion opening, has a door part which is openable by being pressed by the airbag during inflation and an upper edge part which surrounds the door part and extends upward, and is arranged to be exposed to an inside of a vehicle cabin; and a connection wall part which extends forward from a front side of the decorative panel, and is arranged to cover an upper side of an upper wall part on an upper side in the circumferential wall part of the case, wherein: the connection wall part of the airbag cover includes an engaging hole penetrated vertically; the upper wall part of the case includes a metal engaging hook protruding upward to be inserted into the engaging hole; the airbag cover is connected to the case when the engaging hook inserted into the engaging hole is engaged with the connection wall part; the airbag cover includes a shield part configured to hide the engaging hook from a visual line which is directed through an upper side of the upper edge part toward the engaging hook engaged with the connection wall part in a vehicle mounted state; and the shield part is integrally formed during molding of the airbag cover.

In the knee protection airbag device according to the invention, the shield part of the airbag cover can hide the engaging hook which emits metal luster from the visual line of the driver and the like which is directed through the upper side of the upper edge part toward the engaging hook engaged with the connection wall part in a vehicle mounted state, and it is possible to prevent the deterioration of the design property in the vehicle cabin on the front side of the driver.

Since the shield part is formed integrally during molding of the airbag cover, the formation can be simply completed without additional operation that attaches the shield part.

Therefore, in the knee protection airbag device according to the invention, simply, the engaging hook is not recognized visually, and it can be prevented that the design property in the vehicle cabin on the front side of the driver is deteriorated.

Further, according to the knee protection airbag device of the invention, the airbag cover may be arranged such that the shield part protrudes from an area from a rear edge of the engaging hole in an upper side of the connection wall part to an upper end of the upper edge part in a front side of the upper edge part.

With such a configuration, the shield part can be arranged to protrude from the area near the engaging hook, and the space or the molding material is efficiently used when the shield part is arranged.

Specifically, the above-configured shield part can be arranged in the airbag cover to protrude from the lower position separated from the upper end in the front side of the upper edge part toward the front side substantially in parallel to the connection wall part provided with the engaging hole, or to protrude upward from the rear position of the engaging hole in the upper side of the connection wall part.

In the case of the configuration, the shield parts may be arranged to hide the plurality of engaging hooks, separately. However, the plurality of engaging hooks engaged with the plurality of engaging holes provided in parallel in the right and left direction may be arranged as one which extends in a wall shape in the right and left direction to be hidden at the same time.

In the case of the configuration, if the airbag cover is configured to be formed by molding, the shield part is desirably arranged such that at least the surface side of the shield part, the upper side of the connection wall part, and the front side of the upper edge part can be molded by the molding surface of one split mold of the molding die.

In the configuration, the shield part is arranged such that the shield part itself can be molded together with the upper side of the connection wall part or the front side of the upper edge part near the shield part by the molding surface of one split mold of the molding die. Thus, in the molding die which molds the airbag cover made of synthetic resin, the mold structure which molds the vicinity of the shield part can be configured simply using one split mold. Therefore, the airbag cover can be produced while suppressing increase in the number of producing processes and cost, so as to contribute the suppression of the increase in the number of all producing processes and all cost of the airbag device.

In the knee protection airbag device according to the invention, the upper edge part of the airbag cover is configured in the center in the right and left direction such that the recess part is arranged to be recessed downward from the portion of both right and left edges. The shield part is desirably arranged on the front side of the recess part to have a width dimension which is larger than the width dimension of the recess part in the right and left direction and is smaller than the width dimension in the right and left direction in the connection wall part in which the plurality of engaging holes are provided in parallel in the right and left direction.

With such a configuration, in a case where the recess part is provided in the center of the upper edge part in the right and left direction to house the column cover as an upper arranged member of the airbag device, although the engaging hook is arranged in the lateral position exceeding the recess part, the engaging hook is hidden by a portion which extends to the upper side of the both right and left sides of the recess part in the upper edge part so as to be difficult to be recognized visually, and thus it is not necessary to provide the shield part. For this reason, in the airbag cover, the shield part may be provided only in a necessary portion. The reduction of the molding material is achieved, and an effect of the configuration of the split mold provided with the shield part is not made on the split mold of another molded portion, which can facilitate the production.

In the knee protection airbag device according to the invention, desirably, the airbag cover includes, on an upper end of the upper edge part, a tongue part which extends to be curved to the front side.

With such a configuration, the curved surface of the tongue part curved to the front side can be arranged in the upper end of the upper edge part without an end surface provided with the edge-shaped corner part, and an appearance of the upper end of the decorative panel can be excellent. Further, the shield part itself is hidden by the provided tongue part, or the shield part itself including the circumference thereof can be hidden to be dark by the shadow of the provided tongue part. Further, it is possible to remove the discomfort on the upper side of the airbag device and to suppress the deterioration of the design property in the vehicle cabin on the front side of the driver.

Further, according to the knee protection airbag device of the invention, the shield part of the airbag cover may include: a rear front side part which protrudes from a rear position of the engaging hole to hide, from a rear side, the engaging hook which protrudes from the engaging hole; and oblique rear side parts which protrude from both right and left sides of the engaging hole, and hide the engaging hook which protrudes from the engaging hole, from an oblique rear side.

With such a configuration, the shield part includes not only the rear front side part which covers the right rear side of the engaging hook which protrudes from the engaging hole but only the oblique rear side parts to cover the engaging hook from the visual line which is directed to the engaging hook from obliquely rear direction of the engaging hook. Thus, it can become more difficult to recognize the engaging hook visually.

Further, according to the knee protection airbag device of the invention, the shield part of the airbag cover may include: a rear front side part which protrudes to extend in the right and left direction from a rear position of the plurality of engaging holes provided in parallel in the right and left direction, so as to hide, from a rear side, the plurality of engaging hooks which protrude from the engaging hole; and oblique rear side parts which protrude from the lateral outsides of the end-side engaging holes on the lateral end sides in the plurality of the engaging holes in which the rear front side part is arranged in the rear position respectively, and hide, from an obliquely rear side, the engaging hooks which protrude from the end-side engaging holes.

With such a configuration, the rear front side part of the shield part can cover the plurality of engaging hooks from the visual line which is directed forward from the rear side with respect to the plurality of the engaging hooks which protrude from the plurality of the engaging holes. In addition, an intermediate portion which covers the rear side between the engaging holes near the rear front side part of the shield part, and the left and right oblique rear side parts which are arranged in the lateral outsides of the end-side engaging holes of the shield part can cover the engaging hooks from the visual line which is directed from the obliquely rear side toward the engaging hooks. It can become more difficult to visually recognize the plurality of the engaging hooks at the same time by one shield part.

In a case where the shield part includes the rear front side part and the oblique rear side part, if the shield part of the airbag cover is configured such that the left and right oblique rear side parts extend forward from the both right and left sides of the rear front side part, and has a substantially U shape when viewed from the upper side, the rear front side part and the oblique rear side parts are continuously arranged without a gap. Thus, it can become more difficult to visually recognize the engaging hooks, and it is possible to stably prevent the deterioration of the design property in the vehicle cabin on the front side of the driver.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, one embodiment of the invention will be described with reference to the drawings. As illustrated in FIGS. 1 to 4, a knee protection airbag device AB1 of the embodiment is arranged below a steering column 5 which is on a vehicle front side of a driver D, so as to protect a knee K of the seated driver D.

Incidentally, up and down sides, right and left sides, and front and rear sides in this specification correspond to up and down sides, right and left sides, and front and rear sides of the vehicle when the knee protection airbag device AB1 is mounted in the vehicle.

Figure 1:
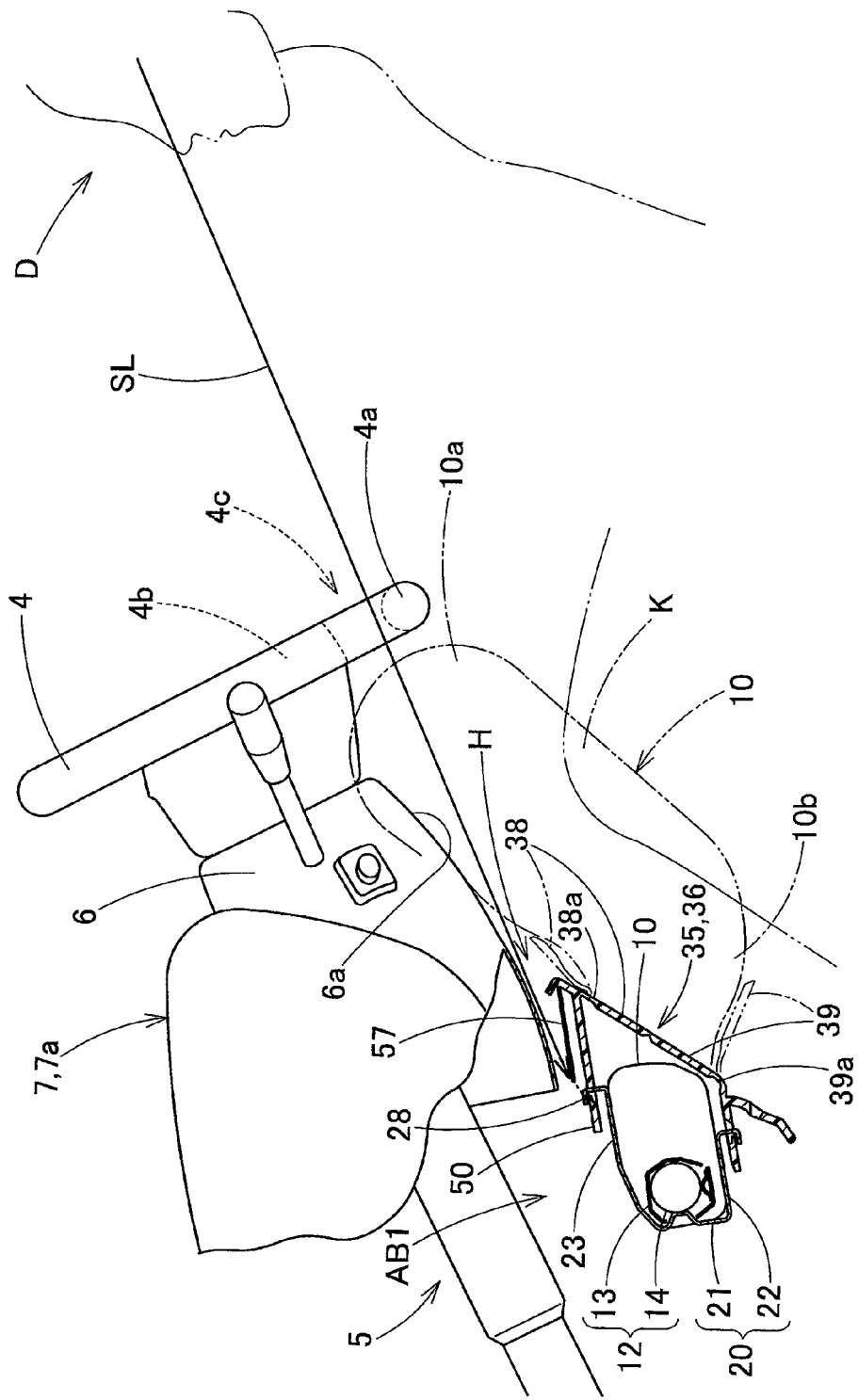
FIG. 1 is a longitudinal sectional view schematically illustrating a state where a knee protection airbag device of an embodiment of the invention is mounted in a vehicle.

As illustrated in FIG. 1, the steering column 5 includes a steering shaft (not illustrated) connected in a steering wheel 4 and a column cover 6 which covers the vicinity thereof. The column cover 6 is made of synthetic resin in a substantially rectangular tubular shape and the like, and is arranged along an axial direction of the steering shaft (not illustrated). In other words, the column cover 6 is arranged to be tilted rearward and upward such that the vehicle front side is arranged on the lower side, and the vehicle rear side is arranged on the upper side. Further, a lower surface 6a of a portion which protrudes from an instrument panel (hereinafter, referred as to an instrument panel) 7 in the column cover 6 has a substantially rectangular shape, and is formed in a rearward and upward curved shape in a front and rear direction of the vehicle. The instrument panel 7 includes an upper panel 7a which surrounds an upper side from both right and left sides of the steering column 5 and a lower panel 7b (see FIG. 3) which surrounds both right and left sides of the knee protection airbag device AB1.

In the steering column 5, vertical position of the steering wheel 4 can be adjusted by a tilt mechanism (not illustrated) which can be operated by the driver D. Through the adjustment, a gap H between the airbag device AB1 and the lower surface 6a of the column cover 6 as the upper arranged member thereof is changed to be large or small.

As illustrated in FIGS. 1 to 4, the knee protection airbag device AB1 includes a folded airbag 10, an inflator 12 which supplies an inflation gas to the airbag 10, a case 20 which houses and holds the airbag 10 and the inflator 12 and has a protrusion opening 20a for the airbag 10, and an airbag cover 35 which covers the protrusion opening 20a of the case 20.

At the completion of inflation, the airbag 10 becomes a substantially quadrangular plate shape in which an upper end 10a reaches the vicinity of the lower surface 6a near the steering wheel 4 of the column cover 6, and is held in the case 20 using the inflator 12 housed in a lower end 10b.

The inflator 12 includes a columnar main body 13, and a substantially cylindrical retainer 14 which interposes and holds the main body 13. The main body 13 includes, on the left end side, a connector part 17 which can couple a lead wire 18 for inputting an operation signal, and a gas discharge part 13a which discharges the inflation gas at the time of operation is arranged on the right end part side separated from the connector part 17.

In the retainer 14, a plurality of (two in the embodiment) bolts 15 which protrude rearward are arranged (see FIG. 4), and the bolts 15 pass through the airbag 10 and the case 20 to fasten a nut 16, so that the airbag 10 and the inflator 12 are attached and fixed in a bottom wall part 21 of the case 20.

The case 20 is made of metal (sheet metal) in a substantially rectangular parallelepiped shape. The case 20 includes, on a rear end side, the protrusion opening 20a which is open in a rectangular shape such that the airbag 10 protrudes during inflation. The case 20 includes a circumferential wall part 22 which extends forward from the circumferential edge of the protrusion opening 20a and has a substantially rectangular tubular shape, and the bottom wall part 21 which blocks the front side of the protrusion opening 20a in the front end of the circumferential wall part 22.

An insertion hole 21a which inserts the bolt 15 provided in the retainer 14 of the inflator 12 is arranged in the bottom wall part 21. In addition, attachment parts 30 and 30 are arranged in the right and left sides of the bottom wall part 21. The attachment parts 30 and 30 are intended to attach and fix the airbag device AB1 to a bracket 2 as a vehicle side member which extends from an instrument panel reinforcement (not illustrated) on the body (vehicle body) 1 side. An attachment hole 30a is penetrated in each of the attachment parts 30. Further, when the bolt 31 is inserted into the attachment hole 30a and the attachment hole 2a of the bracket 2, and the nut 32 is fastened by the bolt 31, the airbag device AB1 is fastened to the bracket 2 using the attachment part 30 of the case 20, and further is attached and fixed on the body 1 side.

The circumferential wall part 22 of the case 20 includes an upper wall part 23 on an upper side, a lower wall part 24 on a lower side, a left wall part 25 on a left side, and a right wall part 26 on a right side. In the left wall part 25, the insertion hole 25a is formed for insertion of the vicinity of the connector part 17 which connects the lead wire 18 for inputting the operation signal to the inflator 12.

In the upper wall part 23 and the lower wall part 24, a plurality of (five in the embodiment) engaging hooks 28 having J-shaped sectional surface are arranged in a right and left direction to protrude to be inverted forward. The engaging hooks 28 are engaged with upper and lower connection wall parts 50 and 51 (to be illustrated below) of the airbag cover 35. The engaging hook 28 includes a protrusion piece part 28a which extends to be separated outward from the upper wall part 23 or the lower wall part 24, and a hook part 28b which extends to be curved to the front side in the tip of the protrusion piece part 28a. The protrusion piece part 28a serves as a portion which passes through the engaging hole 55 of the connection wall parts 50 and 51 of the airbag cover 35. The hook part 28b is a portion which can abut on front-edge-side circumferential edges 50b and 51b of the engaging hole 55 on the outside surface (the upper surface or the lower surface) 50a and 51a side of the connection wall parts 50 and 51, so as to prevent the engaging hook 28 from being removed from the engaging hole 55. Further, an intersection part 28c between the protrusion piece part 28a and the hook part 28b includes an arc-shaped (substantially quarter arc-shaped) curved surface 28d to be inflated outward and rearward (upward and rearward in the upper engaging hook 28).

As illustrated in FIGS. 2 to 6, the airbag cover 35 is made of synthetic resin such as an olefin thermoplastic elastomer which is moldable, and includes a decorative panel 36 which is arranged to confront the front side of the knee K of the driver D and has a substantially rectangular-plate shape, and a circumferential wall part 49 which extends in a rectangular tubular shape forward from a side surface 36a of the decorative panel 36. Incidentally, the airbag cover 35 of the embodiment is produced by a molding die 70 for injection molding illustrated in FIGS. 7A and 7B.

The decorative panel 36 is arranged such that a rear surface 36b is exposed in the vehicle cabin, and includes a door arrangement wall portion 37 of the portion surrounded by the circumferential wall part 49, and the outer edge part 41 which surrounds the door arrangement wall portion 37.

The door arrangement wall portion 37 includes the door parts 38 and 39 which are opened vertically by being pressed by the inflating airbag 10. The upper door part 38 includes a hinge part 38a used when the upper door part is opened to the upper edge side, and the lower door part 39 includes a hinge part 39a used when the lower door part is opened to the lower edge side. Further, near the door parts 38 and 39, a thin breakage expected part 40 which is broken by being pressed by the inflating airbag 10 is arranged in an H shape when viewed from the front surface of the door arrangement wall portion 37. The hinge parts 38a and 39a are formed as a thin integral hinge. Incidentally, the thin shape of the hinge parts 38a and 39a or the breakage expected part 40 is formed by a recess part which is recessed rearward from the side surface 36a of the decorative panel 36.

The outer edge part 41 around the door arrangement wall portion 37 includes an upper edge part 42 which extends to the upper side of the door arrangement wall portion 37, a lower edge part 45 which extends the lower side of the door arrangement wall portion 37, a left edge part 43 on the left side of the door arrangement wall portion 37, and a right edge part 44 on the right side of the door arrangement wall portion 37.

In the upper end 42a of the upper edge part 42, a central portion 42c in the right and left direction is arranged with the recess part 42d which can house the lower surface 6a of the column cover 6 by inserting the lower surface in the front and rear direction. In addition, the upper end 42a is formed with a tongue part 47 which extends to be curved to the front side (obliquely upper side). A plurality of protrusions 41b which are engaged with the lower panel 7b to position the airbag cover 35 are arranged on the front side of extending parts 42e and 42f which extend to the upper side of both lateral sides of the recess part 42d. A reinforcing rib (a reference numeral is not provided in the drawing) is formed on the front side of the lower edge part 45.

The circumferential wall part 49 includes the upper and lower connection wall parts 50 and 51 and left and right side wall parts 52 and 53. The upper connection wall part (upper connection wall part) 50 is arranged above the upper wall part 23 of the case 20. The upper connection wall part is a portion which is connected in the upper wall part 23 by the engaging hook 28. A plurality of (five) engaging holes 55 for inserting the engaging hooks 28 are penetrated vertically and provided in parallel in the right and left direction. The lower connection wall part (lower connection wall part) 51 is arranged below the lower wall part 24 of the case 20. The lower connection wall part is a portion which is connected in the lower wall part 24 by the engaging hook 28. A plurality of (five) engaging holes 55 for inserting the engaging hooks 28 are penetrated vertically and provided in parallel in the right and left direction. The left side wall part (left side wall part) 52 is inserted to the inner circumferential side of the left wall part 25 of the case 20, and the right side wall part (right side wall part) 53 is arranged to be inserted to the inner circumferential side of the right wall part 26 of the case 20.

Figure 2:
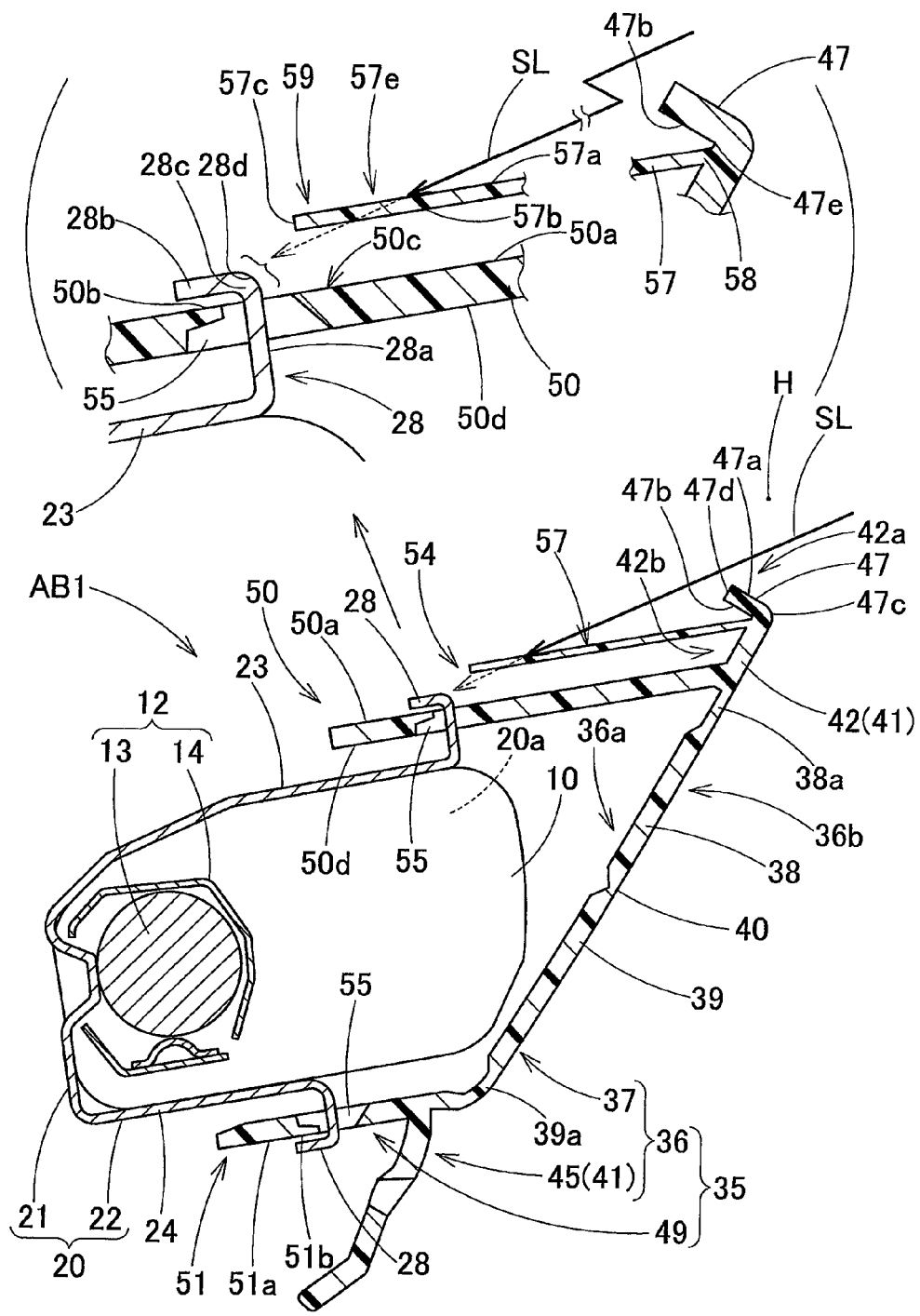
FIG. 2 is an enlarged vertical sectional view of a state where the knee protection airbag device of the embodiment is mounted in the vehicle.
Figure 3:
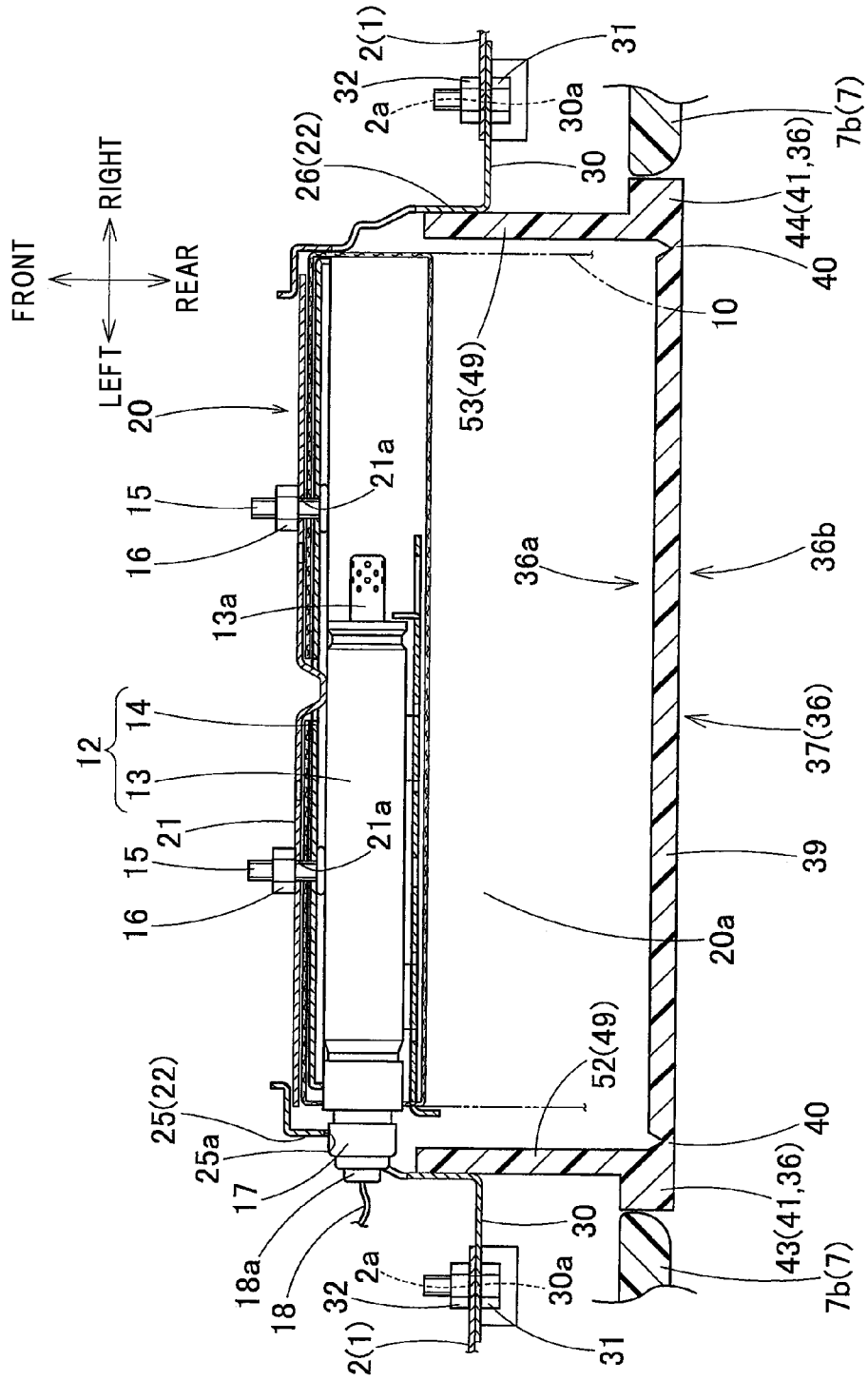
FIG. 3 is an enlarged lateral sectional view of a state where the knee protection airbag device of the embodiment is mounted in the vehicle.
Figure 4:
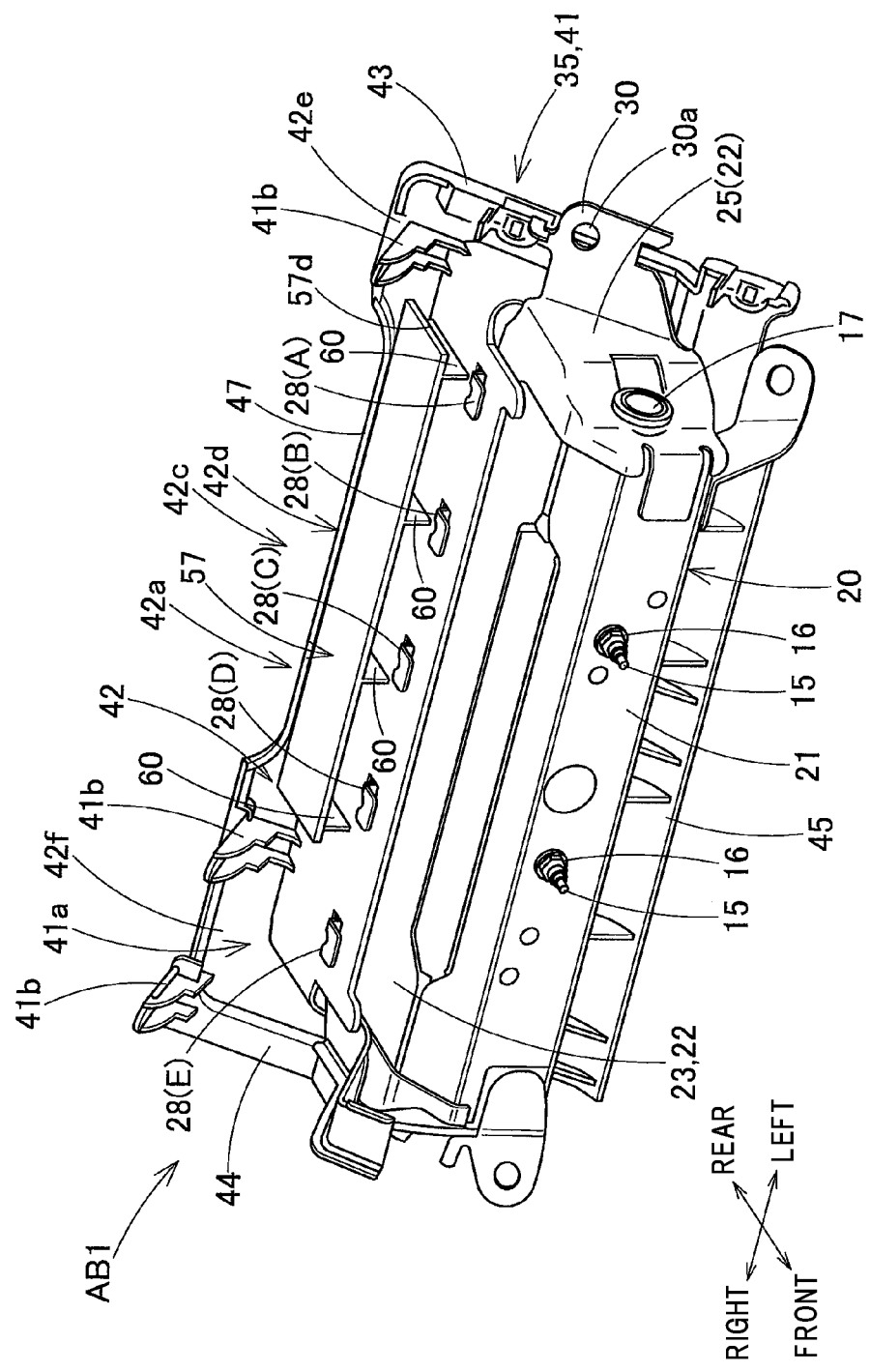
FIG. 4 is a perspective view schematically illustrating the knee protection airbag device of the embodiment when viewed from a front side.
Figure 5:
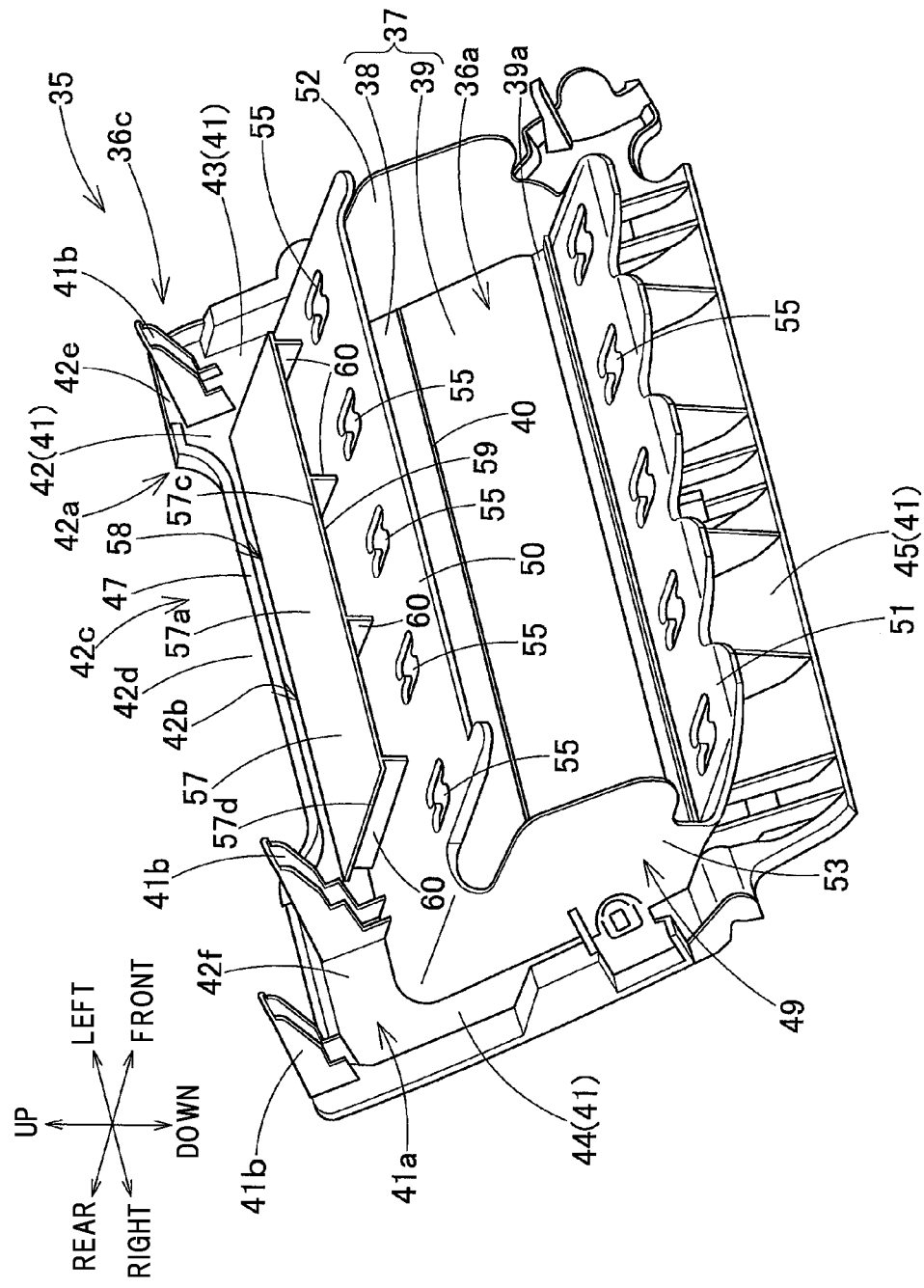
FIG. 5 is a perspective view schematically illustrating the airbag cover of the embodiment when viewed from the front side.
Figure 6:
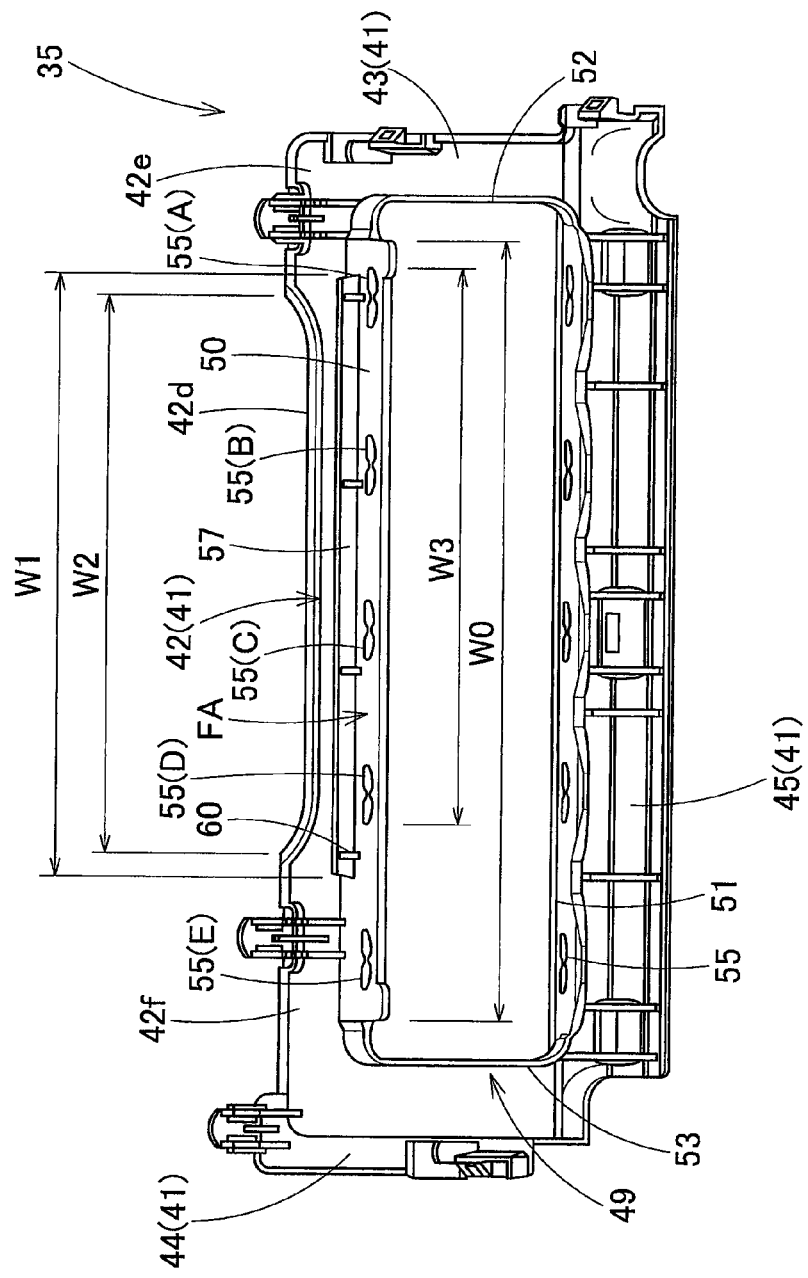
FIG. 6 is a front view schematically illustrating the airbag cover of the embodiment when viewed from the front side.

A shield part 57 is formed above the upper connection wall part 50 of the airbag cover 35 so that the engaging hook 28 engaged with the upper connection wall part 50 is hidden from a visual line SL of the driver D. The visual line SL of the driver D is directed through the upper side of the upper end 42a of the upper edge part 42 toward the engaging hook 28 engaged with the upper connection wall part 50 in a state where the airbag device AB1 is mounted in the vehicle. In the case of the embodiment, as illustrated in FIGS. 1 and 2, the visual line SL passes through a gap 4c in the steering wheel 4 between a ring part 4a of the steering wheel 4 which is gripped by the driver D and a boss part 4b in the center of the ring part 4a, and a gap H between the lower surface 6a of the column cover 6 and the upper end 42a of the upper edge part 42, and reaches the engaging hook 28.

Incidentally, in a case where the engaging hook 28 is recognized visually, part of the arc-shaped curved surface 28d in the intersection part 28c between the protrusion piece part 28a and the hook part 28b emits luster to become conspicuous, and a deep and dark area from the gap H reflects the luster to be shined. Then, the driver D feels discomfort, and the design property of the front side of the driver D near the decorative panel 36 or the column cover 6 is deteriorated.

The shield part 57 is arranged in an area from a rear edge 50c of the engaging hole 55 in the upper surface 50a of the upper connection wall part 50 to the upper end 42a of the upper edge part 42 in the side surface 42b of the upper edge part 42 such that the tip 59 which extends at least in the right and left direction hides the intersection part 28C which easily emits the luster of the engaging hooks 28 (A to D) provided in parallel in the right and left direction. Further, the shield part 57 is arranged such that a surface 57e (an upper surface 57a, a lower surface 57b, a front end surface 57c, and side surfaces 57d) of the shield part 57, the upper surface 50a of the upper connection wall part 50, and the outer surface 54 of the side surface 42b of the upper edge part 42 can be molded by a molding surface 75a of one split mold 75 of the molding die 70 (see FIGS. 7A and 7B).

Specifically, in the case of the embodiment, the shield part 57 protrudes in a wall shape (belt shape) extending in the right and left direction from the lower position (in the embodiment, a lower position slightly separated from a root part 47e of the lower surface 47b of the tongue part 47 (to be illustrated below)) separated from the upper end 42a in the side surface 42b of the upper edge part 42 toward the front side in parallel to the upper connection wall part 50 provided with the engaging hole 55. In other words, the shield part (shielding wall part) 57 is formed in a thin planar shape having a constant plate thickness from the root part 58 of the rear end side coupled with the upper edge part 42 to the tip 59 on the front end side, and the upper surface 57a and the lower surface 57b are arranged in parallel to the upper surface 50a of the upper connection wall part 50.

Incidentally, in the case of the embodiment, the upper connection wall part 50 is also formed in a planar shape having a constant plate thickness.

Particularly, the shield part 57 of the embodiment is arranged to have a width dimension W1 which is larger than a width dimension W2 of the recess part 42d in the right and left direction on the front side of the recess part 42d, and a width dimension W0 of the upper connection wall part 50 in the right and left direction in which a plurality of engaging holes 55 are provided in parallel in the right and left direction.

In the case of the embodiment, the block part 57 is arranged to hide four engaging hooks 28 (A, B, C, and D) arranged on the front side of the recess part 42d (see FIG. 4), and does not have the width dimension until the rear side of the engaging hook 28E. For this reason, the engaging hook 28E on the right end side deviated from the front side of the recess part 42d can be screened by the extending part 42f which extends upward near the recess part 42d in the upper edge part 42. Thus, the shield part 57 is not arranged on the rear side of the portion of the engaging hook 28E.

A plurality of thin ribs 60 which extend from the connection wall part 50 and are arranged along the right and left direction in the lower surface 57b of the shield part 57, are arranged to reinforce the shield part 57 of the thin plate shape. The ribs 60 are formed as a rectangular plate shape which extends in the front and rear direction, and arranged to be molded together with the shield part 57 by the split mold 75 (to be illustrated below).

Figure 7A:
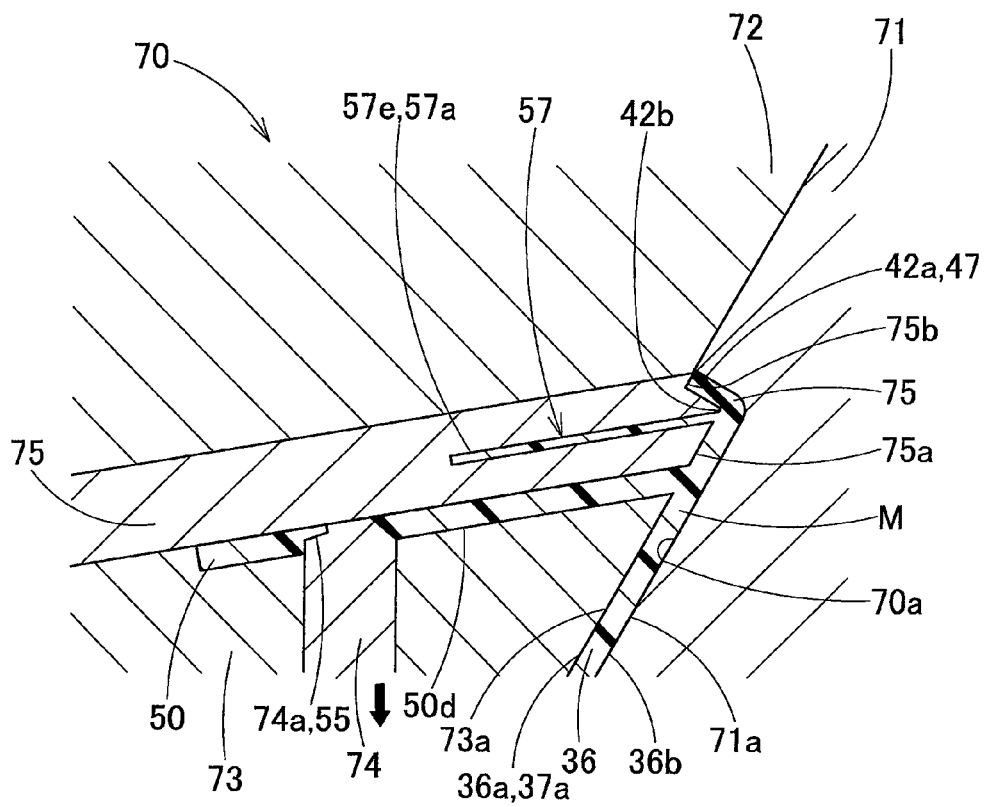
FIGS. 7A and 7B are partially vertical sectional views schematically explaining formation of a shield part of the airbag cover of the embodiment.
Figure 7B:
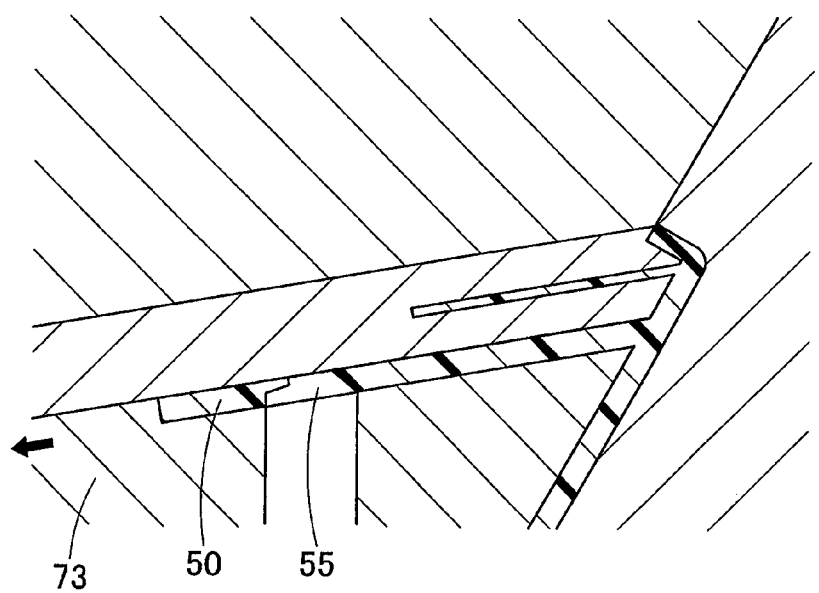

As illustrated in FIGS. 7A and 7B, in the molding die 70 of the airbag cover 35, a cavity 70a which can mold the airbag cover 35 can be formed during mold clamping. Further, five split molds 71, 72, 73, 74, and 75 are used near the molded portion of the shield part 57. As illustrated in FIGS. 7A and 7B and FIGS. 8A and 8B, the split mold 71 includes a molding surface (mold surface) 71a which can mold the rear surface 36b of the decorative panel 36 and the upper surface 47a of the tongue part 47. The split mold 72 includes a molding surface (not illustrated) which can mold a predetermined portion of the side surface 41a of the outer edge part 41 separated from the shield part 57. The split mold 73 includes a molding surface 73a which can mold a portion of the lower surface 50d of the upper connection wall part 50 and the side surface 37a of the door arrangement wall portion 37. The split mold 74 includes a molding surface 74a which can mold the inner circumferential surface of the engaging hole 55 of the upper connection wall part 50. Further, the split mold 75 includes a molding surface 75a which can mold the entire area of the surface 57e (including the upper surface 57a, the lower surface 57b, the front end surface 57c, and the right and left side surfaces 57d) of the shield part 57, the side surface 42b of the upper edge part 42, the lower surface 47b and the front end surface 47d of the tongue part 47, and the upper surface 50a of the upper connection wall part 50.

Figure 8A:
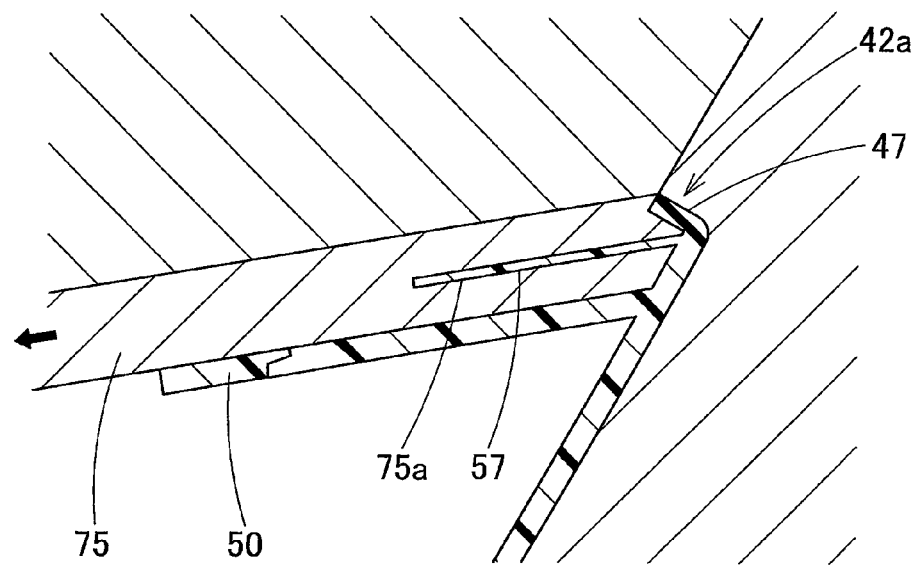
FIGS. 8A and 8B are longitudinal sectional views schematically illustrating a state a molding die illustrated in FIG. 7 is opened.
Figure 8B:
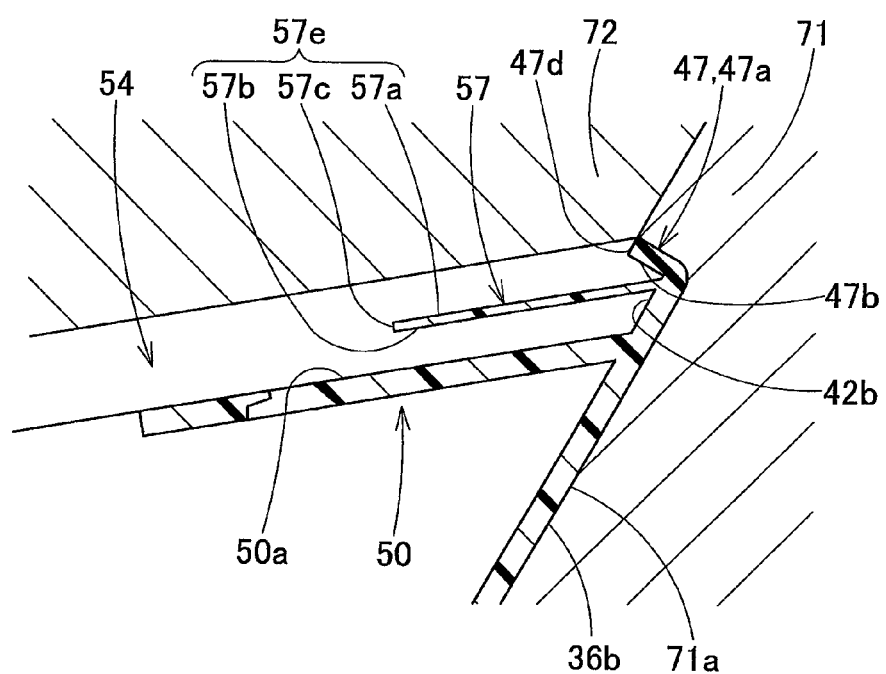

During molding, as illustrated in FIG. 7A, the molding material M of the airbag cover 35 is injected into the cavity 70a of the clamped molding die 70 to be solidified. Then, as illustrated in FIGS. 7B and 8A, the split mold 74 is moved to be separated from the molded engaging hole 55, and the split mold 73 is moved to be separated from the side surface 37a of the molded door arrangement wall portion 37. Thereafter, as illustrated in FIG. 8B, the split mold 75 is moved along the upper connection wall part 50 to be separated from the vicinity of the molded shield part 57. Thereafter, the remaining split mold 72 and split mold 71 are opened to be separated relatively from each other, and when the molds are opened, it is possible to obtain the molded airbag cover 35.

When the airbag cover 35 molded as above is assembled as the airbag device AB1 and is mounted in the vehicle, first, the airbag 10 is folded in a state where the inflator 12 is housed. After the airbag 10 is folded, the airbag 10 is wrapped by a breakable wrapping film for collapse prevention (not illustrated). Incidentally, the connector part 17 or the bolt 15 which connects the lead wire 18 of the inflator 12 protrudes from the wrapping film. Further, in the case 20, the airbag 10 is housed, the vicinity of the connector part 17 of the inflator 12 protrudes from the insertion hole 25a, and the bolt 15 protrudes from the insertion hole 21a. When the nut 16 is clamped by the protruding bolt 15, the inflator 12 and the airbag 10 can be attached to the case 20. Thereafter, the airbag cover 35 is connected to the case 20. In the connection, when the engaging hooks 28 of the case 20 are inserted into the corresponding engaging holes 55 of the connection wall parts 50 and 51 of the airbag cover 35, and engaged with the circumferential edges 50b and 51b of the engaging holes 55, the airbag cover 35 can be connected to the case 20 to assemble the airbag device AB1.

Thereafter, if the attachment parts 30 and 30 are fixed in the bracket 2 of the body 1 side using the bolt 31 and the nut 32, the knee protection airbag device AB1 can be mounted in the vehicle.

When a connector 18*a* of the lead wire 18 is coupled with the connector part 17 of the inflator 12, and the upper panel 7*a* or the lower panel 7*b* of the instrument panel 7 is assembled in the vehicle, the knee protection airbag device AB1 of the embodiment can be completely mounted in the vehicle.

After the airbag device AB1 is mounted in the vehicle, when an operating signal is input to the inflator 12, the inflation gas is discharged from the gas discharge part 13*a* of the main body 13, and the airbag 10 is inflated to break the wrapping film (not illustrated) and break the breakage expected part 40, and presses and opens the door parts 38 and 39 of the airbag cover 35 to protrude from the protrusion opening 20*a* of the case 20 to the vehicle rear side. Further, the airbag 10 is largely deployed and inflated upward along the lower surface 6*a* of the column cover while the folding is released, so as to protect the knee K of the driver D (see the two-dot chain line of FIG. 1).

In the knee protection airbag device AB1 of the embodiment, as illustrated in FIGS. 1 and 2, the shield part 57 of the airbag cover 35 blocks the visual line SL of the driver D which is directed through the upper side of the upper end 42*a* of the upper edge part 42 toward the engaging hook 28 engaged with the upper connection wall part 50 in a vehicle mounted state. Thus, it is possible to hide the metal engaging hook 28 which emits the luster, and to prevent that the design property in the vehicle cabin on the front side of the driver D is deteriorated.

Since the shield part 57 is formed integrally during molding of the airbag cover 35, the formation can be simply completed without additional operation that attaches the shield part 57.

Therefore, in the knee protection airbag device AB1 of the embodiment, simply, the engaging hook 28 is not recognized visually, and it can be prevented that the design property in the vehicle cabin on the front side of the driver D is deteriorated.

In the embodiment, in the airbag cover 35, the shield part 57 is arranged to protrude from an area from the rear edge 50*c* of the engaging hole 55 in the upper surface 50*a* of the upper connection wall part 50 to the upper end 42*a* of the upper edge part 42 in the side surface 42*b* of the upper edge part 42 (in the embodiment, the vicinity of the oblique rear lower portion of the upper end 42*a* of the upper edge part 42).

For this reason, in the embodiment, the shield part 57 can be arranged to protrude from the area near the engaging hook 28, and the space or the molding material is efficiently used when the shield part 57 is arranged.

In the case of the embodiment, the airbag cover 35 is formed by molding, and the shield part 57 is arranged such that at least the surface 57*e* of the shield part 57, the upper surface 50*a* of the connection wall part 50, and the side surface 42*b* of the upper edge part 42 can be molded by the molding surface 75*a* of one split mold 75 of the molding die 70.

For this reason, in the embodiment, the shield part 57 is arranged such that the shield part 57 itself can be molded by the molding surface 75*a* of one split mold 75 of the molding die 70 together with the upper surface 50*a* of the connection wall part 50 or the side surface 42*b* of the upper edge part 42 near the shield part 57. Thus, in the molding die 70 which molds the airbag cover 35 made of synthetic resin, the mold structure which molds the vicinity of the shield part 57 can be configured simply using one split mold 75. Therefore, the airbag cover 35 can be produced while suppressing increase in the number of producing processes and cost, so as to contribute the suppression of the increase in the number of all producing processes and all cost of the airbag device AB1.

Incidentally, in the case of the embodiment, the shield part 57 protrudes from the lower position separated from the upper end 42*a* in the side surface 42*b* of the upper edge part 42 toward the front side in substantially parallel to the upper connection wall part 50 provided with the engaging hole 55. The split mold 75 is moved in parallel to the molded upper connection wall part 50, so as to be smoothly separated from the molded shield part 57 and the upper connection wall part 50. The entire area of the shield part 57 having a wall shape (belt shape) can be simply molded by one split mold 75, together with wide range of the upper surface 50*a* of the upper connection wall part 50, and further, the mold structure which molds the vicinity of the shield part 57 can be simplified.

In the embodiment, the upper edge part 42 of the airbag cover 35 is configured in the center in the right and left direction such that the recess part 42*d* is arranged to be recessed downward from the portion of both right and left edges. The shield part 57 is arranged on the front side of the recess part 42*d* to have the width dimension W1 which is larger than the width dimension W2 of the recess part 42*d* in the right and left direction and is smaller than the width dimension W0 in the right and left direction in the upper connection wall part 50 in which a plurality of engaging holes 55 are provided in parallel in the right and left direction.

For this reason, in the embodiment, the recess part 42*d* is included in the center of the upper edge part 42 in the right and left direction to house the column cover 6 as an upper arranged member of the airbag device AB1. Although the engaging hook 28E is arranged in the lateral position exceeding the recess part 42*d* as well as the engaging hooks 28A, 28B, 28C, and 28D arranged on the front side of the recess part 42*d*, the engaging hook 28E is hidden by a portion (an extending part in the embodiment) 42*f* which extends to the upper side of the both right and left sides of the recess part 42*d* in the upper edge part 42 so as to be difficult to be recognized visually, and thus it is not necessary to provide the shield part 57. For this reason, as the airbag cover 35, the shield part 57 may be provided only in a necessary portion. The reduction of the molding material is achieved, and an effect of the configuration of the split mold 75 provided with the shield part 57 is not made on the split mold 72 and the like of another molded portion, which can facilitate the production.

In other words, the shield part 57 may be arranged on the rear side which corresponds to a hook arrangement area FA (see FIG. 6) of the engaging holes 55 (55A, 55B, 55C, and 55D) into which the engaging hooks 28A, 28B, 28C, and 28D necessary to be hidden except the engaging hook 28E which may be not necessarily hidden are inserted. In other words, the shield part 57 may be arranged to have the width dimension W2 corresponding to the width dimension W3 of the hook arrangement area FA except the engaging hole 55E into which the engaging hook 28E not necessary to be hidden is inserted.

In the embodiment, the airbag cover 35 includes, in the upper end 42*a* of the upper edge part 42, the tongue part 47 which extends to be curved to the front side.

For this reason, in the embodiment, the curved surface 47*c* of the tongue part 47 curved to the front side can be arranged in the upper end 42*a* of the upper edge part 42 without an end surface provided with the edge-shaped corner part, and an appearance of the upper end 36*c* of the decorative panel 36 can be excellent. Further, the shield part 57 itself is hidden by the provided tongue part 47, or the shield part 57 itself including the circumference thereof can be hidden to be dark by the shadow of the provided tongue part 47. Further, it is possible to remove the discomfort of the upper side of the airbag device AB1 and to suppress the deterioration of the design property in the vehicle cabin on the front side of the driver D.

Incidentally, in the tongue part 47, the lower surface 47b or the front end surface 47d can be molded by a portion 75b of the molding surface 75a of the split mold 75 which molds the upper surface 57a of the shield part 57. The molding can be completed while the split mold which forms the tongue part 47 is not used additionally, and it is possible to prevent that the number of the components of the molding die 70 or the producing cost is increased.

Figure 9:
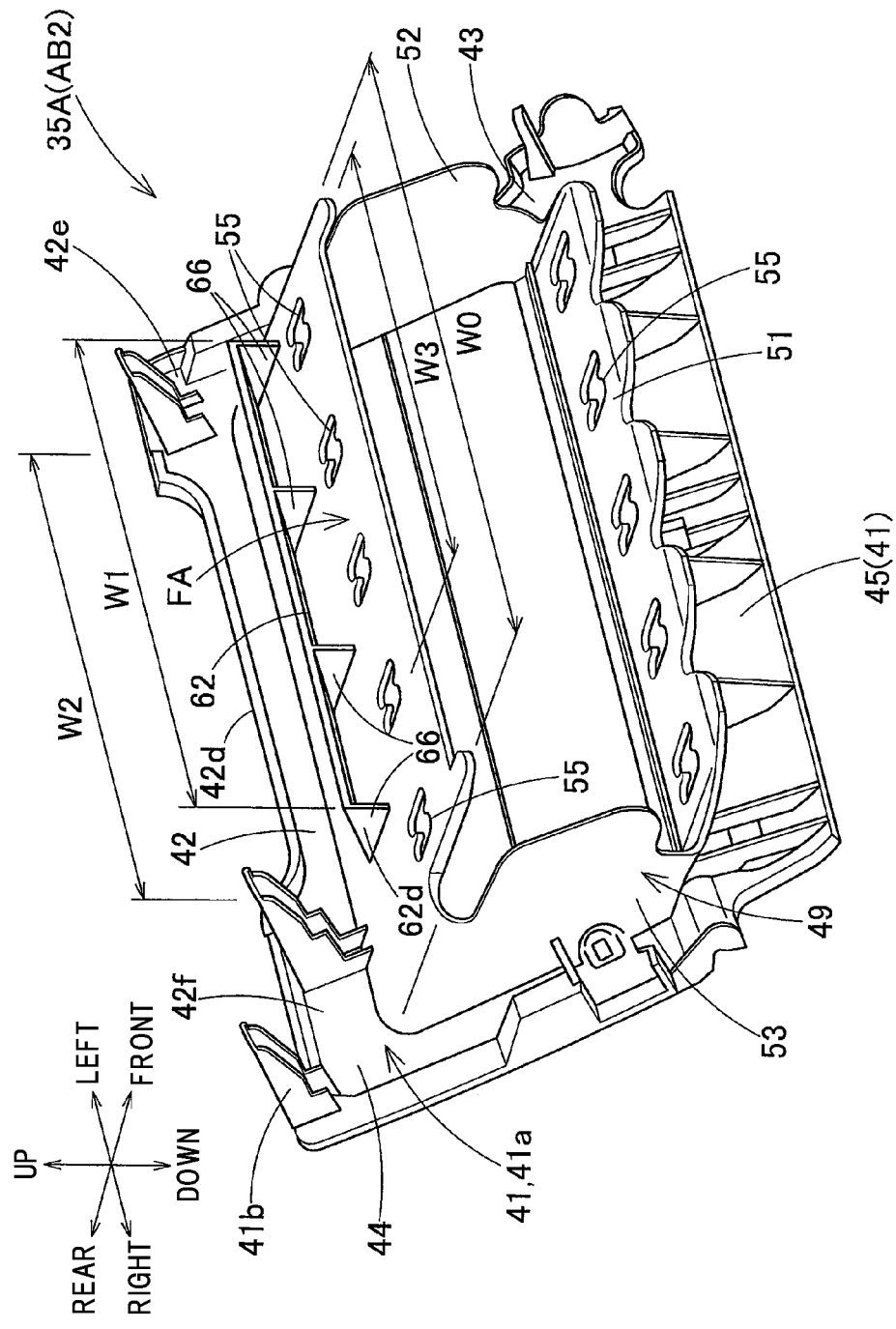
FIG. 9 is a perspective view schematically illustrating an airbag cover of a modification of the embodiment when viewed from the front side.
Figure 10:
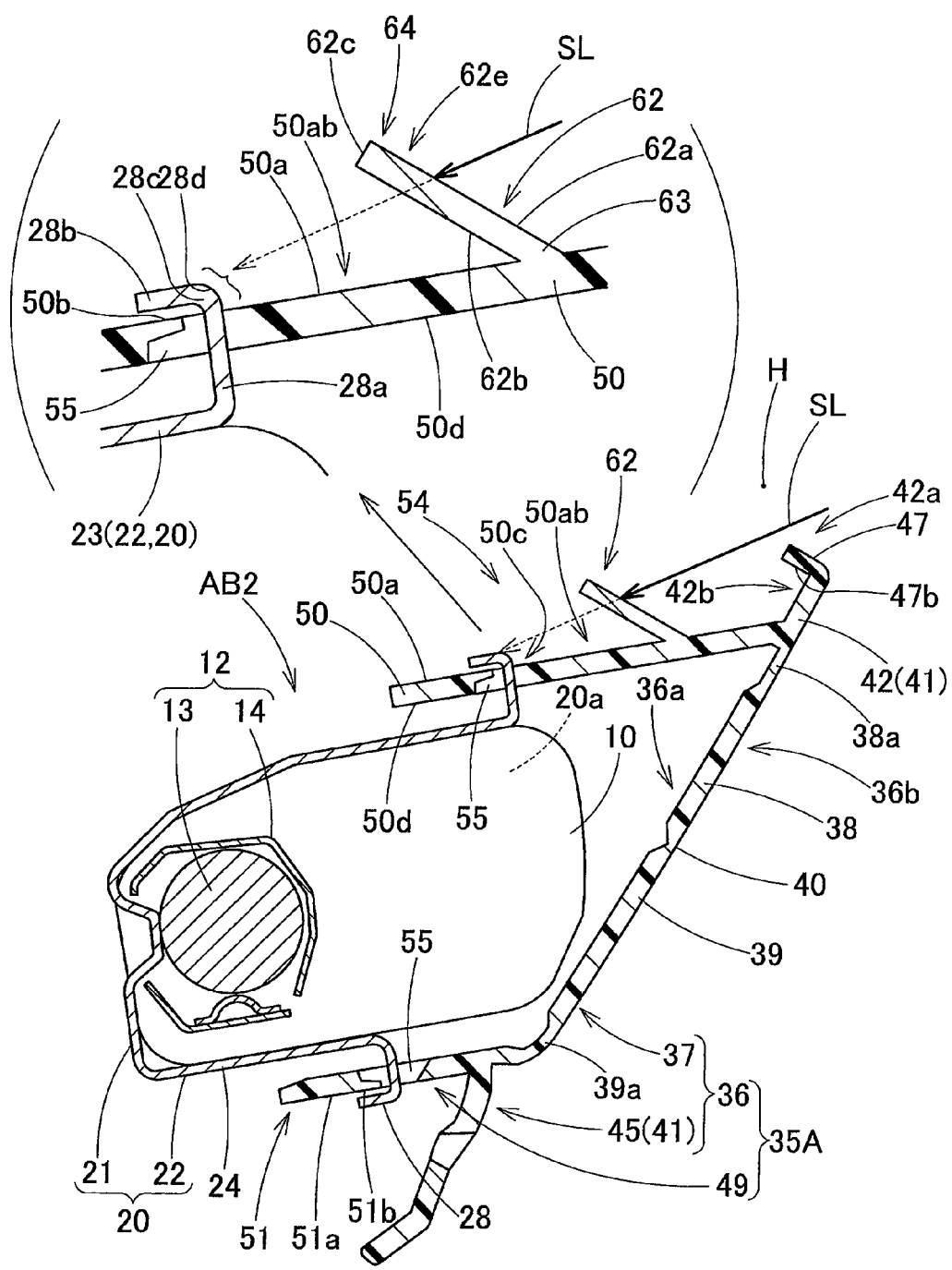
FIG. 10 is an enlarged vertical sectional view illustrating a state where the knee protection airbag device using the airbag cover of the modification is mounted in the vehicle.

The shield part of the airbag cover may be configured to be similar to an airbag cover 35A of an airbag device AB2 illustrated in FIGS. 9 and 10 as long as the shield part screens the visual line SL of the driver D and the like which is directed through the upper side of the upper end 42a of the upper edge part 42 toward the engaging hook 28 engaged with the connection wall part 50 in the vehicle mounted state.

Incidentally, as illustrated below, the shield part 62 of the airbag cover 35A is arranged in the area from the rear edge 50c of the engaging hole 55 in the upper surface 50a of the connection wall part 50 to the upper end 42a of the upper edge part 42 in the side surface 42b of the upper edge part 42. The outer surface 54 of the surface 62e (the upper surface 62a, the lower surface 62b, the front end surface 62c, and the left and right side surfaces 62d) of the shield part 62, the upper surface 50a of the connection wall part 50, and the side surface 42b of the upper edge part 42 are arranged to be moldable by the molding surface 85a of the one split mold 85 of the molding die 80 illustrated in FIGS. 11A and 11B and FIGS. 12A and 12B.

In the airbag cover 35A, the shield part 62 protrudes toward the obliquely upper side from a rear position 50ab of the engaging hole 55 in the upper surface 50a of the upper connection wall part 50. In other words, in the shield part 62, the root part 63 is arranged between the engaging hole 55 and the upper edge part 42 in the upper surface 50a of the upper connection wall part 50 (in the illustrated example, the position in the substantially middle in the front and rear direction). The shield part 62 extends obliquely upward from the root part 63 to the tip 64 and is arranged in a wall shape (belt shape) along the right and left direction, such that the tip 64 which extends in at least the right and left direction hides the intersection part 28c which easily emits the luster of the engaging hooks 28 (A to D) provided in parallel in the right and left direction (also referred to as a shielding wall part 62). Further, the shield part 62 is formed in a thin planar shape having a constant plate thickness from the root part 63 of the rear end side to the tip 64 of the front end, and the upper surface 62a and the lower surface 62b are arranged in parallel to the lower surface 47b of the tongue part 47 arranged in the upper end 42a of the upper edge part 42.

Similarly to the shield part 57, the shield part 62 is arranged to have a dimension larger than the width W2 of the recess part 42d in the right and left direction on the front side of the recess part 42d and smaller than the width dimension W0 of the upper connection wall part 50 in the right and left direction in which the plurality of engaging holes 55 are provided in parallel in the right and left direction. In other words, the shield part 62 is arranged to hide four engaging hooks 28 (A, B, C, and D) arranged in the front side of the recess part 42d (see FIGS. 4 and 9, in other words, is arranged to correspond to the hook arrangement area FA (the area of the width dimension W3)). The engaging hook 28E of the right end side deviated from the front side of the recess part 42d is configured to be screened by the extending part 42f which extends upward near the recess part 42d of the upper edge part 42.

The lower surface 62b of the shield part 62 is arranged in the right and left direction with a plurality of arranged thin ribs 66 which extend from the connection wall part 50, so as to reinforce the shield part 62 of the thin plate shape. The rib 66 is formed in a triangular plate shape which extends in the front and rear direction, and is arranged to be moldable together with the shield part 62 by the split mold 85 (to be illustrated below).

As illustrated in FIGS. 11A and 11B and FIGS. 12A and 12B, the molding die 80 which molds the airbag cover 35A can form the cavity 80a which can mold the airbag cover 35A during mold clamping. Further, five split molds 81, 82, 83, 84, and 85 are used near the molded portion of the shield part 62. The split mold 81 includes a molding surface (mold surface) 81a which can mold the rear surface 36b of the decorative panel 36 and the upper surface 47a of the tongue part 47. The split mold 82 includes a molding surface (not illustrated) which can mold a predetermined portion of the side surface 41a of the outer edge part 41 separated from the shield part 62. The split mold 83 includes a molding surface 83a which can mold a portion of the lower surface 50d of the upper connection wall part 50 and the side surface 37a of the door arrangement wall portion 37. The split mold 84 includes a molding surface 84a which can mold the inner circumferential surface of the engaging hole 55 of the upper connection wall part 50. Further, the split mold 85 includes the molding surface 85a which can mold the entire area of the surface 62e of the shield part 62, the upper surface 50a of the upper connection wall part 50, the side surface 42b of the upper edge part 42, and the lower surface 47b of the tongue part 47. The molding surface 85a includes a portion 85b which can mold the front end surface 47d of the tongue part 47.

Figure 11A:
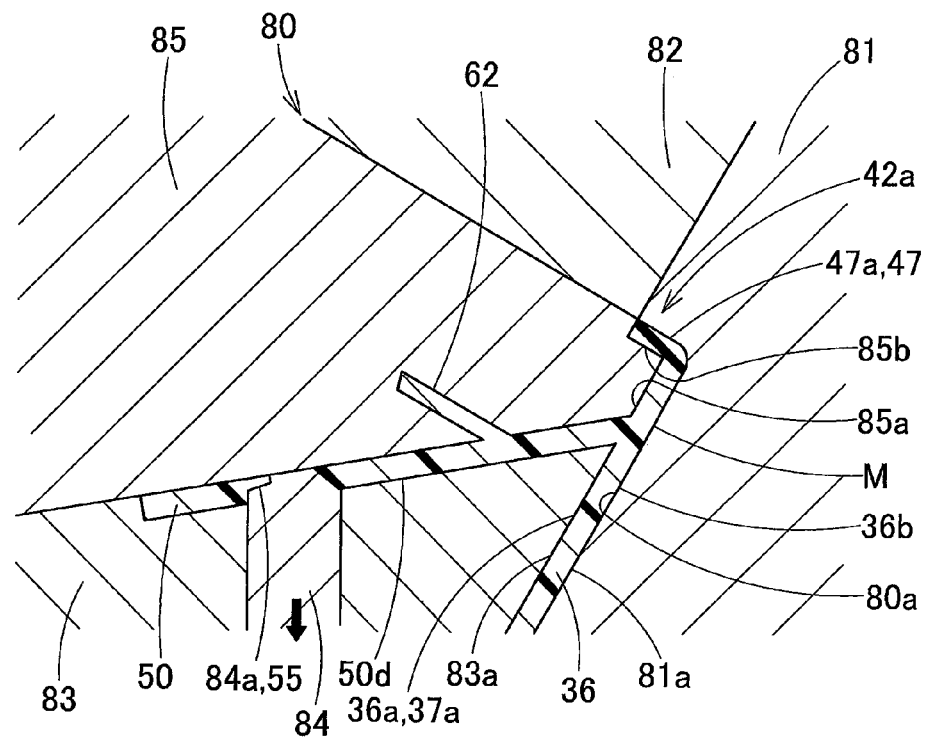
FIGS. 11A and 11B are partially vertical sectional views schematically explaining formation of a shield part of the airbag cover of the modification.
Figure 11B:
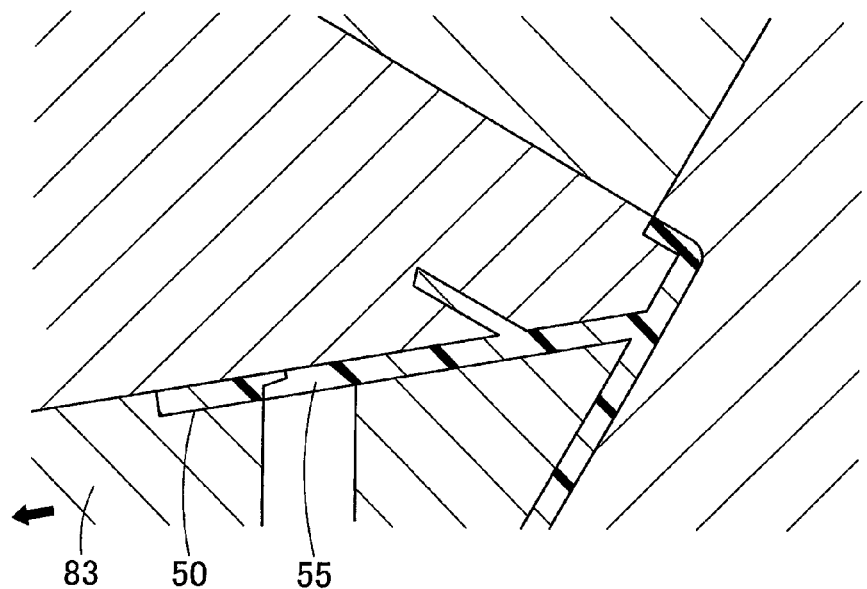
Figure 12A:
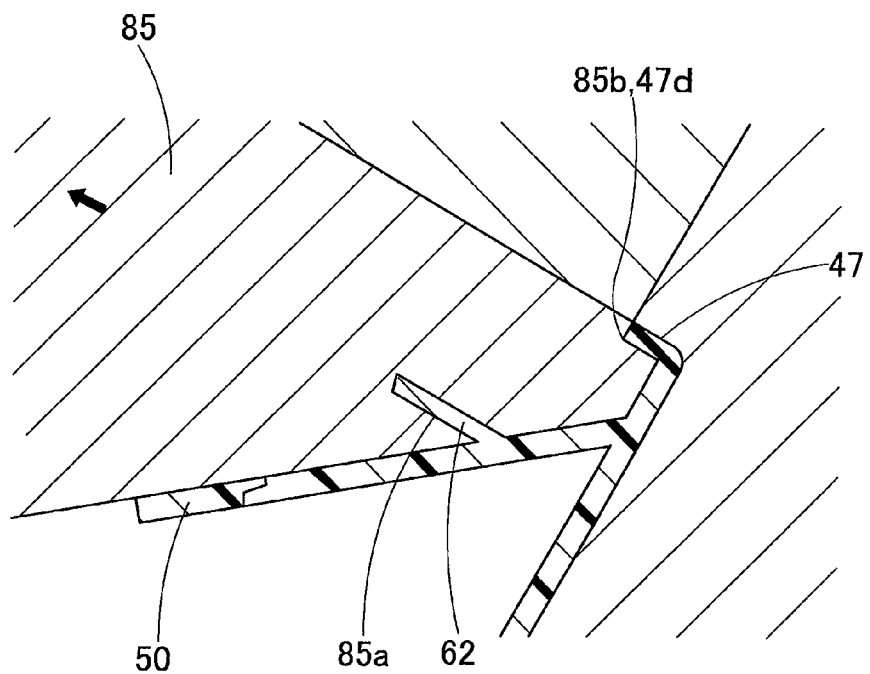
FIGS. 12A and 12B are longitudinal sectional views schematically illustrating a state where the molding die illustrated in FIG. 11 is opened.
Figure 12B:
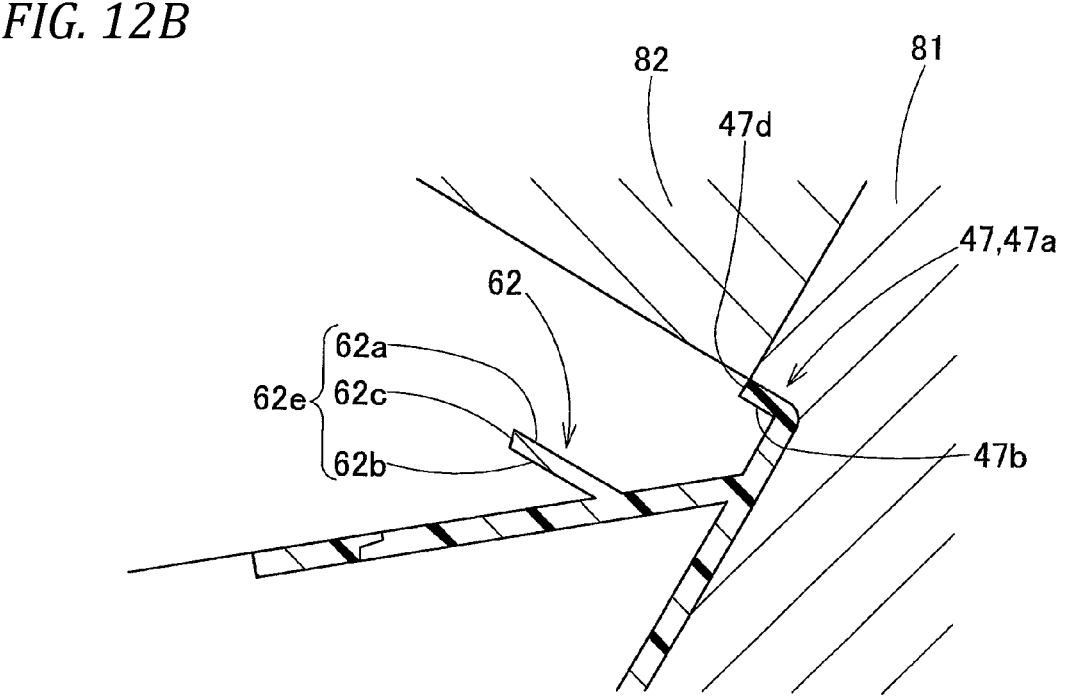
Figure 13:
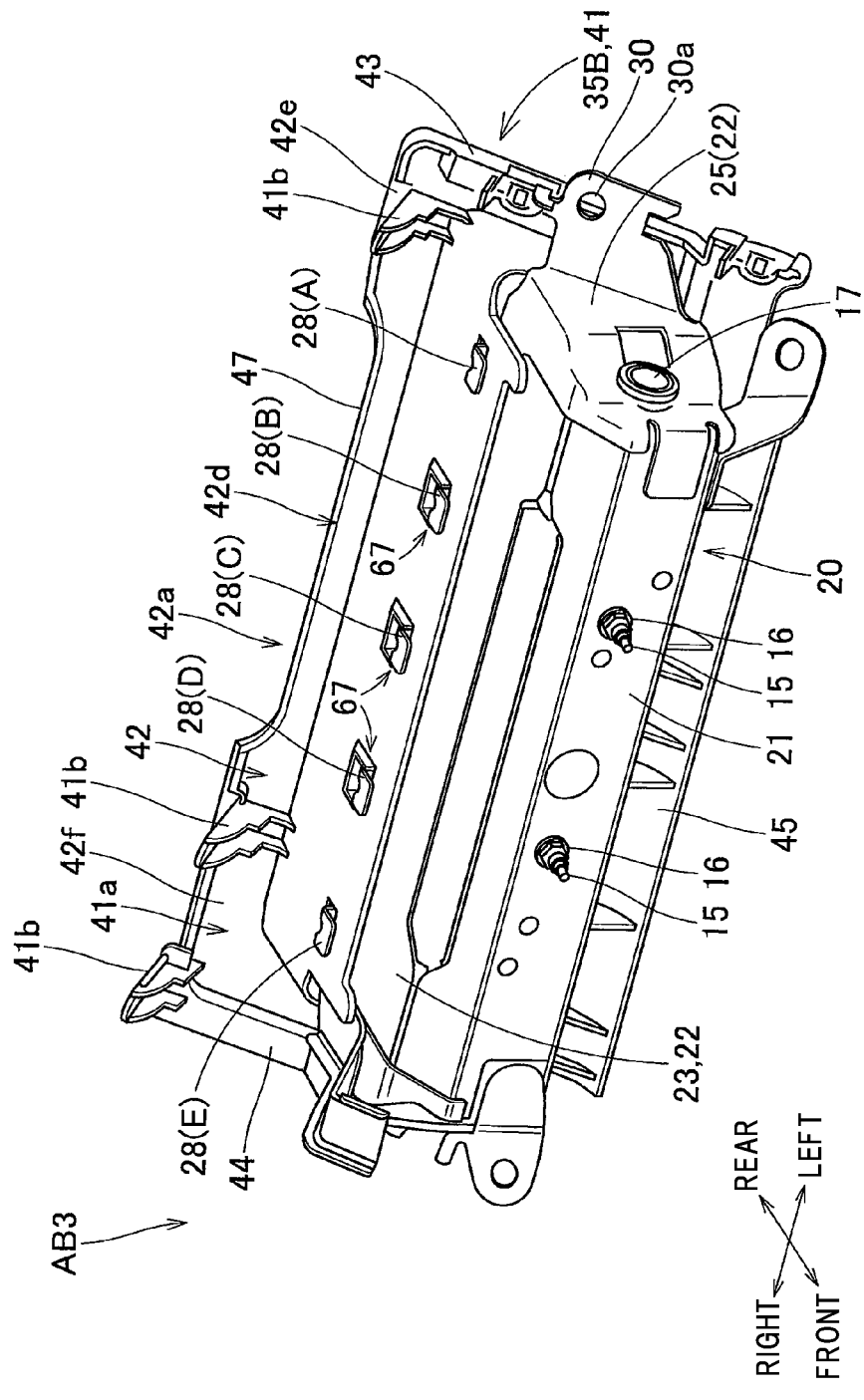
FIG. 13 is a perspective view schematically illustrating a knee protection airbag device of another modification when viewed from the front side.
Figure 14:
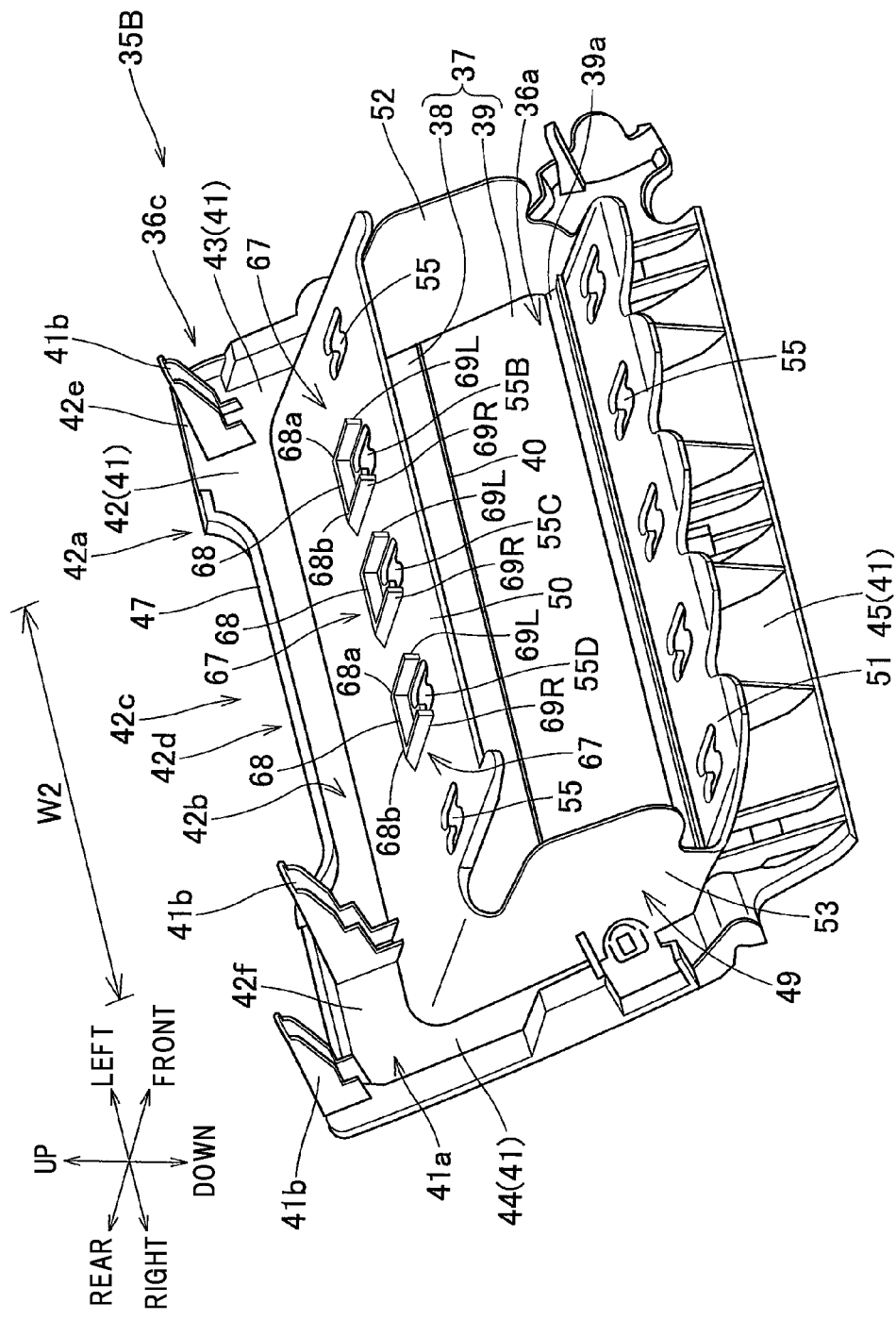
FIG. 14 is a perspective view schematically illustrating an airbag cover of the knee protection airbag device illustrated in FIG. 13 when viewed from the front side.
Figure 15:
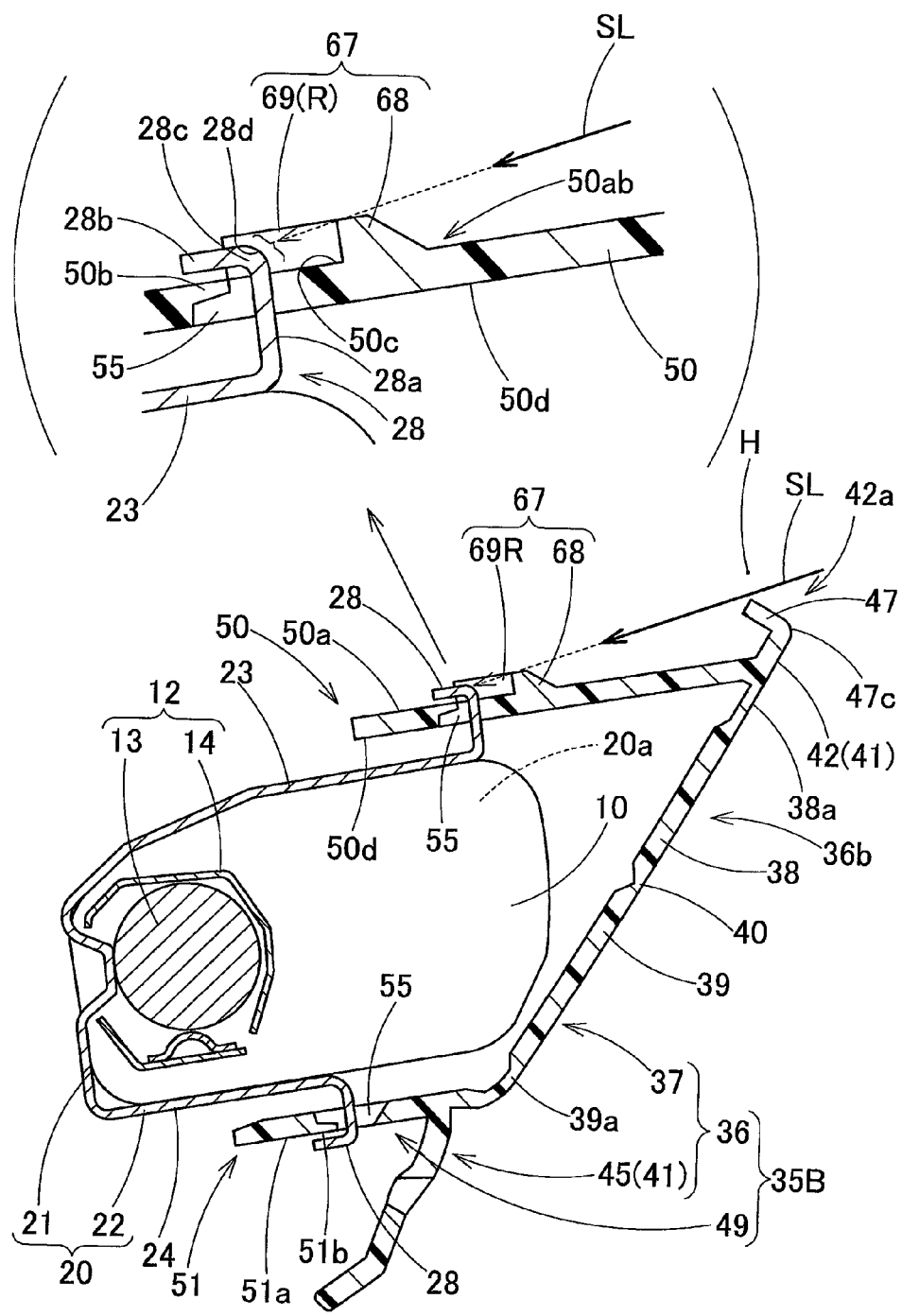
FIG. 15 is an enlarged vertical sectional view illustrating a state where the knee protection airbag device illustrated in FIG. 13 is mounted in the vehicle.
Figure 16A:
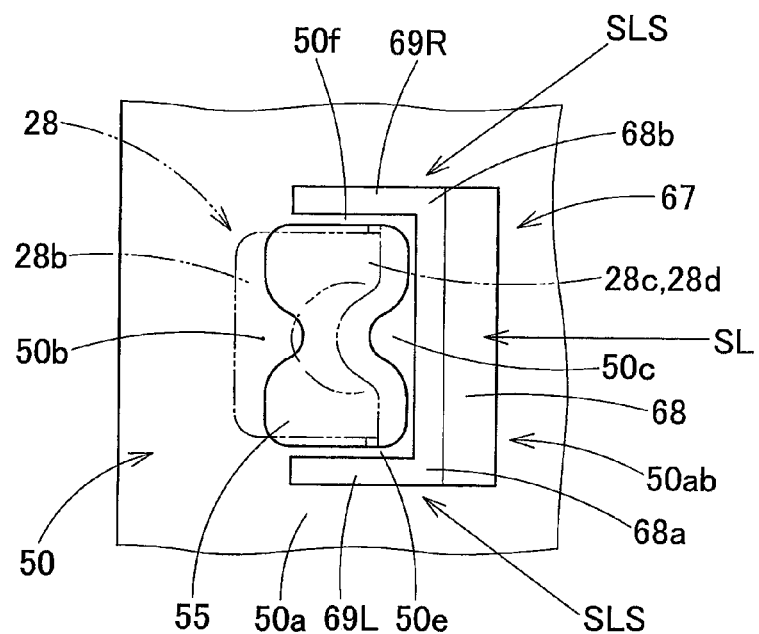
FIGS. 16A and 16B are a plan view and a schematic longitudinal sectional view illustrating the shield part of the airbag cover of the knee protection airbag device illustrated in FIG. 13.
Figure 16B:
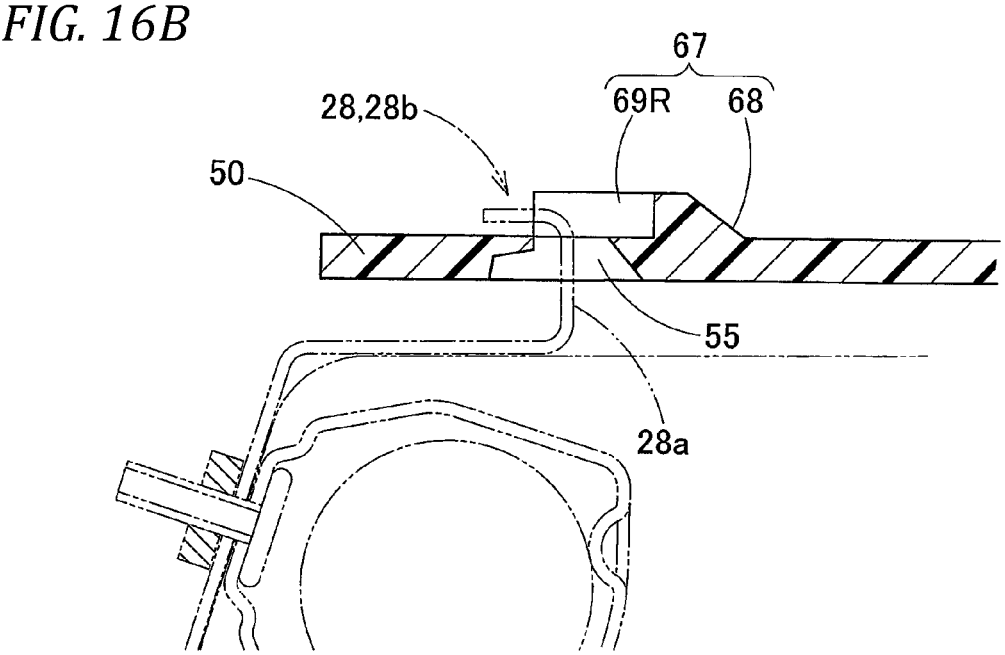

During molding, as illustrated in FIG. 11A, the molding material M of the airbag cover 35A is injected into the cavity 80a of the clamped molding die 80 to be solidified. Then, as illustrated in FIGS. 11B and 12A, the split mold 84 is moved to be separated from the molded engaging hole 55, and the split mold 83 is moved to be separated from the side surface 37a of the molded door arrangement wall portion 37. Thereafter, as illustrated in FIG. 12B, the split mold 85 is moved along the upper surface 62a of the mold shield part 62 to be separated from the vicinity of the molded shield part 62. Thereafter, the remaining split mold 82 and split mold 81 are opened to be separated relatively from each other, and when the molds are opened, it is possible to obtain the molded airbag cover 35A.

Similarly to the airbag cover 35 of the embodiment, the airbag cover 35A produced as above may be assembles as the airbag device AB2 to be mounted in the vehicle.

Also in the airbag cover 35A, the shield part 62 blocks the visual line SL of the driver and the like near the intersection part 28c of the engaging hook 28, so that the luster of the engaging hook 28 is not recognized visually by the driver and the like. In addition, the airbag cover 35A having the shield part 62 can be molded by the molding die 80 which is not complicated. Further, the tongue part 47 is included, and the shield part 62 is arranged only on the front side of the recess part 42d. Thus, it is possible to obtain the operation and effect similar to the embodiment.

Incidentally, in the airbag covers 35 and 35A of the embodiment or the modification, the shield parts 57 and 62 are arranged to hide a plurality of the engaging hooks 28A, 28B, 28C, and 28D. However, the shield parts 57 and 62 may be arranged to be divided to block the visual line SL directed to the vicinity of the intersection part 28c of the engaging hook 28.

In order that the shield part hides the engaging hook 28 separately, the airbag cover may be configured like the airbag cover 35B of the knee protection airbag device AB3 illustrated in FIGS. 13 to 16. Incidentally, in the knee protection airbag device AB3, the same reference numerals as those of the airbag devices AB1 and AB2 denote members or the portion similar to the airbag devices AB1 and AB2 of the embodiment or the modification, and the description is omitted.

In the airbag cover 35B, the shield part 67 protrudes upward from the vicinity of the rear edge 50c of the rear position 50ab of the engaging hole 55 in the upper surface 50a of the upper connection wall part 50. The shield part 67 includes a rear front side part 68 which hides, from the rear side, the engaging hook 28 which protrudes from the engaging hole 55, and oblique rear side parts 69L and 69R which protrude upward from the vicinity of a left edge 50e or a right edge 50f on both right and left sides of the engaging hole 55, and hide, from the obliquely rear side, the engaging hook 28 which protrudes from the engaging hole 55. In the case of the illustrated example, the left and right oblique rear side parts 69L and 69R are arranged to extend forward from end parts 68a and 68b of the both right and left sides of the rear front side part 68. In the shield part 67, the left and right oblique rear side parts 69L and 69R and the rear front side part 68 are connected to form substantially U shape when viewed from the upper side. Of course, the shield part 67 is molded integrally with the upper connection wall part 50 and the like during molding of the airbag cover 35.

The shield part 67 is set to have a height from the upper surface 50a of the upper connection wall part 50 such that the intersection part 28c on the rear part side of the engaging hook 28 or the vicinity of the side surface thereof is screened from the visual line SL directed from the rear side to the front side (engaging hook 28) or a visual line SLS directed from the rear side deviated in the right and left direction toward the obliquely front side (engaging hook 28).

In the case of the illustrated example, the recess part 42d of the central portion 42c of the upper edge part 42 in the airbag cover 35B has the smaller width dimension W2 than the recess part 42d of the airbag covers 35 and 35A. The shield parts 67 are arranged to screen the engaging hooks 28B, 28C, and 28D which are inserted into three engaging holes 55B, 55C, and 55D.

In the knee protection airbag device AB3, the shield part 67 of the airbag cover 35B covers the right rear side of the engaging hook 28 which protrudes from the engaging hole 55. The shield part 67 includes not only the rear front side part 68 which covers the engaging hook 28 from the visual line SL directed forward from the rear side, but also the oblique rear side parts 69L and 69R to cover the engaging hook 28 from the visual line SLS of the driver or an occupant at a passenger's seat which is directed to the engaging hook 28 from obliquely rear direction of the engaging hook 28. Thus, it can become more difficult to visually recognize the engaging hook 28.

Particularly, in the shield part 67, the left and right oblique rear side parts 69L and 69R are configured to extend forward from both left and right end parts 68a and 68b of the rear front side part 68, and the shield part has a substantially U shape when viewed from the upper side. Since the rear front side part 68 and the oblique rear side parts 69L and 69R are continuously arranged without a gap, it can become more difficult to visually recognize the engaging hook 28, and it is possible to stably prevent the deterioration of the design property in the vehicle cabin on the front side of the driver and the like.

Of course, if the engaging hook 28 is covered from the visual line SLS of the driver, the occupant at a passenger's seat, or the like which is directed toward the engaging hook 28 from the obliquely rear side of the engaging hook 28, the oblique rear side parts 69L and 69R may be arranged with a gap provided with respect to the left and right end parts 68a and 68b of the rear front side part 68. For example, the oblique rear side parts 69L and 69R may be arranged to be separated from the end parts 68a and 68b in the right and left direction, and to extend from the rear position of the end parts 68a and 68b toward the left and right edges 50e and 50f of the engaging hole 55.

Figure 17:
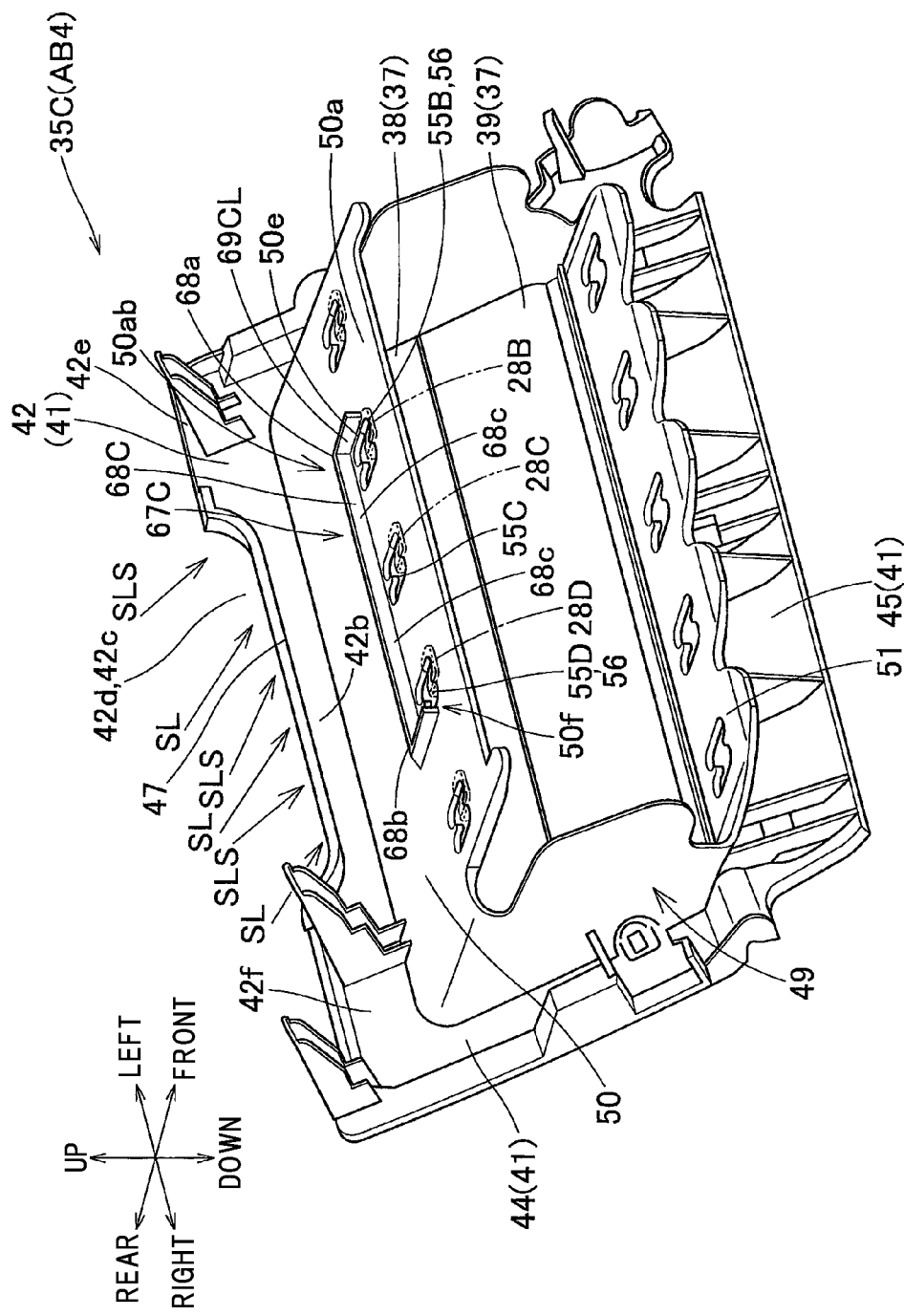
FIG. 17 is a perspective view schematically illustrating an airbag cover in a knee protection airbag device of still another modification when viewed from the front side.

In a case where the shield part includes the rear front side part and the left and right oblique rear side parts, the airbag cover may be configured like the airbag cover 35C of the knee protection airbag device AM4 illustrated in FIG. 17.

In the shield part 67C of the airbag cover 35C, the rear front side part 68C is arranged in the upper surface 50a of the upper connection wall part 50, so as to protrude upward and extend in the right and left direction from the rear position 50ab of a plurality of the engaging holes 55B, 55C, and 55D which are provided in parallel in the right and left direction, and to hide, from the rear side, a plurality of the engaging hooks 28B, 28C, and 28D which protrude from the engaging holes 55B, 55C, and 55D. In addition, the left and right oblique rear side parts 69CL and 69CR are arranged in the upper surface 50a of the upper connection wall part 50, so as to protrude upward from the edges 50e and 50f on the lateral outside of the end-side engaging holes 56 (55B and 55D) on the lateral end sides of a plurality of the engaging holes 55B, 55C, and 55D in which the rear front side part 68C is arranged in the rear position 50ab, respectively, and to hide, from the obliquely rear side, the engaging hooks 28B and 28D which protrude from the end-side engaging holes 56 (55B and 55D). Of course, the shield part 67C is molded integrally with the upper connection wall part 50 and the like during molding of the airbag cover 35C.

In the airbag cover 35C, the rear front side part 68C of the shield part 67C can cover the engaging hooks 28B, 28C, and 28D from the visual line SL which is directed forward from the rear side with respect to the plurality of the engaging hooks 28B, 28C, and 28D which protrude from a plurality of the engaging holes 55B, 55B, and 55D. In addition, an intermediate portion 68c which covers the rear side between the engaging holes 55 near the rear front side part 68C of the shield part 67C, and the left and right oblique rear side parts 69CL and 69CR which are arranged in the lateral outside of the end-side engaging holes 56 (55B and 55D) of the shield part 67C can cover the engaging hooks 28B, 28C, and 28D from the visual line SLS which is directed from the obliquely rear side toward the engaging hooks 28B, 28C, and 28D. It can become more difficult to visually recognize the plurality of the engaging hooks 28B, 28C, and 28D at the same time by one shield part 67C.

Also in the airbag cover 35C, the shield part 67C is configured such that the left and right oblique rear side parts 69CL and 69CR extend forward from the both left and right end parts 68a and 68b of the rear front side part 68C, and has a substantially U shape when viewed from the upper side. Since the rear front side part 68C and the oblique rear side parts 69CL and 69CR are continuously arranged without a gap, it can become more difficult to visually recognize the engaging hooks 28B, 28C, and 28D, and it is possible to stably prevent the deterioration of the design property in the vehicle cabin on the front side of the driver and the like.

Of course, if the engaging hooks 28B, 28C, and 28D are covered from the visual line SLS of the driver, the occupant at a passenger's seat, or the like which is directed toward the engaging hooks 28B, 28C, and 28D from the obliquely rear side of the engaging hooks 28B, 28C, and 28D, the oblique rear side parts 69CL and 69CR may be arranged with a gap provided with respect to the left and right end parts 68a and 68b of the rear front side part 68C.

Incidentally, in a case where the shield parts 57, 62, 67, and 67C are formed in the airbag covers 35, 35A, 35B, and 35C such that the engaging hook 28 is hardly recognized visually from the gap H below the column cover 6 as an upper arranged member arranged above the knee protection airbag devices AB1, AB2, AB3, and AB4, although the column cover 6 as the upper arranged member is arranged right above the airbag devices AB1, AB2, AB3, and AB4 (for example, a decorative panel such as the lower panel 7b of the instrument panel 7 is arranged right above the knee protection airbag device, and the engaging hook can be visually observed from the gap between the upper end of the decorative panel and the column cover 6 as an upper arranged member), the invention is applied so that the shield part provided in the airbag can cover prevents that the engaging hook is recognized visually from the gap on the lower side of the column cover 6 as an upper arranged member.

What is claimed is:

1. A knee protection airbag device mounted on a front side of a seated driver, the device comprising:
    a case which houses a driver-knee protection airbag and includes a circumferential wall part surrounding a protrusion opening and extending in a front side, the protrusion opening being arranged toward a rear side and allowing the airbag to protrude during inflation; and
    an airbag cover, made by rigid resin, covering the protrusion opening of the case to allow the airbag to protrude during inflation, the airbag cover being connected to the case, and the airbag cover including:
        a decorative panel which covers the protrusion opening, has a door part which is openable by being pressed by the airbag during inflation and an upper edge part which surrounds the door part and extends upward, and is arranged to be exposed to an inside of a vehicle cabin; and
        a connection wall part which extends forward from a front side of the decorative panel, and is arranged to cover an upper side of an upper wall part on an upper side in the circumferential wall part of the case, wherein:
    the connection wall part of the airbag cover includes an engaging hole penetrated vertically;
    the upper wall part of the case includes a metal engaging hook protruding upward to be inserted into the engaging hole;
    the airbag cover is connected to the case when the engaging hook is inserted into the engaging hole is engaged with the connection wall part;
    the airbag cover includes a shield part configured to hide the engaging hook from a visual line which is directed through an upper side of the upper edge part toward the engaging hook engaged with the connection wall part in a vehicle mounted state; and
    the shield part is integrally formed during molding of the airbag cover, wherein:
    the shield part of the airbag cover is arranged to extend in a wall shape in a right and left direction, so as to hide a plurality of the engaging hooks engaged in a plurality of the engaging holes provided in parallel in the right and left direction,
    a recess part which is recessed downward from portions of both right and left edges is arranged in a center in the right and left direction in the upper edge part of the airbag cover; and
    the shield part is arranged on a front side of the recess part to have a width dimension larger than a width dimension of the recess part in the right and left direction and smaller than a width dimension in the right and left direction in the connection wall part in which the plurality of the engaging holes are provided in parallel in the right and left direction.

2. The knee protection airbag device according to claim 1, wherein
    the airbag cover includes, in an upper end of the upper edge part, a tongue part which extends to be curved to the front side.

3. A knee protection airbag device mounted on a front side of a seated driver, the device comprising:
    a case which houses a driver-knee protection airbag and includes a circumferential wall part surrounding a protrusion opening and extending in a front side, the protrusion opening being arranged toward a rear side and allowing the airbag to protrude during inflation; and
    an airbag cover, made by rigid resin, covering the protrusion opening of the case to allow the airbag to protrude during inflation, the airbag cover being connected to the case, and the airbag cover including:
        a decorative panel which covers the protrusion opening, has a door part which is openable by being pressed by the airbag during inflation and an upper edge part which surrounds the door part and extends upward, and is arranged to be exposed to an inside of a vehicle cabin; and
        a connection wall part which extends forward from a front side of the decorative panel, and is arranged to cover an upper side of an upper wall part on an upper side in the circumferential wall part of the case, wherein:
    the connection wall part of the airbag cover includes an engaging hole penetrated vertically;
    the upper wall part of the case includes a metal engaging hook protruding upward to be inserted into the engaging hole;
    the airbag cover is connected to the case when the engaging hook is inserted into the engaging hole is engaged with the connection wall part;
    the airbag cover includes a shield part configured to hide the engaging hook from a visual line which is directed through an upper side of the upper edge part toward the engaging hook engaged with the connection wall part in a vehicle mounted state; and
    the shield part is integrally formed during molding of the airbag cover, wherein
    the airbag cover is arranged such that the shield part protrudes from an area from a rear edge of the engaging hole in an upper side of the connection wall part to an upper end of the upper edge part in a front side of the upper edge part, the shield part of the airbag cover protrudes upward from a rear position of the engaging hole in an upper side of the connection wall part, the shield part of the airbag cover includes:
- a rear front side part which protrudes from a rear position of the engaging hole to hide, from a rear side, the engaging hook which protrudes from the engaging hole; and
- oblique rear side parts which protrude from both right and left sides of the engaging hole, and hide the engaging hook which protrudes from the engaging hole, from an oblique rear side.

4. The knee protection airbag device according to claim 3, wherein:
   the shield part of the airbag cover is formed by molding; and
   the shield part is arranged so that at least a surface of the shield part, an upper surface of the connection wall part, and a front side of the upper edge part are molded by a molding surface of one split mold of a molding die.

5. The knee protection airbag device according to claim 3, wherein
   the shield part of the airbag cover is configured such that the right and left oblique rear side parts extend forward from both right and left sides of the rear front side part, and has a substantially U shape when viewed from an upper side.

6. A knee protection airbag device mounted on a front side of a seated driver, the device comprising:
   a case which houses a driver-knee protection airbag and includes a circumferential wall part surrounding a protrusion opening and extending in a front side, the protrusion opening being arranged toward a rear side and allowing the airbag to protrude during inflation; and
   an airbag cover, made by rigid resin, covering the protrusion opening of the case to allow the airbag to protrude during inflation, the airbag cover being connected to the case, and the airbag cover including:
      a decorative panel which covers the protrusion opening, has a door part which is openable by being pressed by the airbag during inflation and an upper edge part which surrounds the door part and extends upward, and is arranged to be exposed to an inside of a vehicle cabin; and
      a connection wall part which extends forward from a front side of the decorative panel, and is arranged to cover an upper side of an upper wall part on an upper side in the circumferential wall part of the case, wherein:

the connection wall part of the airbag cover includes an engaging hole penetrated vertically;
   the upper wall part of the case includes a metal engaging hook protruding upward to be inserted into the engaging hole;
   the airbag cover is connected to the case when the engaging hook is inserted into the engaging hole is engaged with the connection wall part;
   the airbag cover includes a shield part configured to hide the engaging hook from a visual line which is directed through an upper side of the upper edge part toward the engaging hook engaged with the connection wall part in a vehicle mounted state; and
   the shield part is integrally formed during molding of the airbag cover, wherein
   the airbag cover is arranged such that the shield part protrudes from an area from a rear edge of the engaging hole in an upper side of the connection wall part to an upper end of the upper edge part in a front side of the upper edge part,
   the shield part of the airbag cover protrudes upward from a rear position of the engaging hole in an upper side of the connection wall part,
   the shield part of the airbag cover includes:
      a rear front side part which protrudes to extend in the right and left direction from a rear position of at least one engaging hole of the plurality of engaging holes provided in parallel in the right and left direction, so as to hide, from a rear side, the plurality of engaging hooks which protrude from the engaging hole; and
      oblique rear side parts which protrude from lateral outsides of end-side engaging holes on lateral end sides in the engaging holes in which the rear front side part is arranged in the rear position respectively, and hide, from an obliquely rear side, the engaging hooks which protrude from the end-side engaging holes, each of the plurality of engaging holes receives a respective one of the plurality of engaging hooks.

7. The knee protection airbag device according to claim 6, wherein
   the shield part of the airbag cover is configured such that the right and left oblique rear side parts extend forward from both right and left sides of the rear front side part, and has a substantially U shape when viewed from an upper side.

* * * * *